United States Patent
Ersal et al.

(10) Patent No.: US 12,195,083 B2
(45) Date of Patent: Jan. 14, 2025

(54) LANE CHANGE MANEUVERS WITH MINIMIZED TIRE SLIP

(71) Applicant: THE REGENTS OF THE UNIVERSITY OF MICHIGAN, Ann Arbor, MI (US)

(72) Inventors: Tulga Ersal, Ann Arbor, MI (US); Jeffrey L. Stein, Ann Arbor, MI (US); John B. Wurts, Ann Arbor, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 148 days.

(21) Appl. No.: 16/452,936

(22) Filed: Jun. 26, 2019

(65) Prior Publication Data
US 2020/0406969 A1  Dec. 31, 2020

(51) Int. Cl.
*B62D 15/02* (2006.01)
*B60W 30/18* (2012.01)
*B60W 40/101* (2012.01)

(52) U.S. Cl.
CPC ............ *B62D 15/0265* (2013.01); *B60W 30/18163* (2013.01); *B60W 30/18172* (2013.01);
(Continued)

(58) Field of Classification Search
CPC .......... B62D 15/0265; B62D 15/0255; B60W 30/18163; B60W 30/18172;
(Continued)

(56) References Cited

U.S. PATENT DOCUMENTS

| 6,208,928 B1* | 3/2001 | Batistic | B60T 8/1755 |
| | | | 303/163 |
| 8,473,144 B1* | 6/2013 | Dolgov | G08G 1/167 |
| | | | 701/28 |

(Continued)

OTHER PUBLICATIONS

Abbas, et al., Obstacle Avoidance in Real Time with Nonlinear Model Predictive Control of Autonomous Vehicles, Canadian Journal of Electrical and Computer Engineering, 2017, 40(1):12-22.

(Continued)

*Primary Examiner* — Aniss Chad
*Assistant Examiner* — Stephanie T Su
(74) *Attorney, Agent, or Firm* — Quarles & Brady LLP

(57) ABSTRACT

A method in a data processing system including at least one processor and at least one memory including instructions executed by the at least one processor to implement a lane change system is provided by the present disclosure. The method includes receiving, from at least one of a plurality of sensors coupled to a vehicle, information associated with a location of an object longitudinally ahead of the vehicle, determining a sequence of control inputs associated with a time horizon to avoid a collision between the vehicle and the object based on a constraint and the location of the object, and the determining the sequence of control inputs including minimizing a maximum tire slip angle of the vehicle during the time horizon subject to the constraint, and causing a vehicle control system of the vehicle to perform a vehicle maneuver based on the sequence of control inputs.

18 Claims, 17 Drawing Sheets

(52) U.S. Cl.
CPC ....... *B60W 40/101* (2013.01); *B62D 15/0255* (2013.01); *B60W 2520/10* (2013.01); *B60W 2520/12* (2013.01); *B60W 2520/14* (2013.01); *B60W 2552/30* (2020.02); *B60W 2555/60* (2020.02); *B60W 2710/20* (2013.01)

(58) Field of Classification Search
CPC ........... B60W 40/101; B60W 2552/30; B60W 2555/60; B60W 2520/10; B60W 2520/12; B60W 2520/14; B60W 2710/20
See application file for complete search history.

(56) References Cited

U.S. PATENT DOCUMENTS

| | | | |
|---|---|---|---|
| 2002/0016653 A1* | 2/2002 | Levine | B60T 7/12 701/1 |
| 2009/0118905 A1* | 5/2009 | Takenaka | B60W 40/064 701/41 |
| 2013/0218396 A1* | 8/2013 | Moshchuk | G08G 1/165 701/25 |
| 2019/0283722 A1* | 9/2019 | Haas | B60T 8/17552 |
| 2021/0053564 A1* | 2/2021 | Imamura | B60T 8/175 |

OTHER PUBLICATIONS

Alleyne, et al., A Comparison of Alternative Obstacle Avoidance Strategies for Vehicle Control, Vehicle System Dynamics, 1997, 27(5-6):371-392.

Altche, et al., A Simple Dynamic Model for Aggressive, Near-Limits Trajectory Planning, IEEE, 2017, In 2017 IEEE Intelligent Vehicles Symposium (IV), pp. 141-147.

Anderson, et al., An Optimal-Control-Based Framework for Trajectory Planning, Threat Assessment, and Semi-Autonomous Control of Passenger Vehicles in Hazard Avoidance Scenarios, International Journal of Vehicle Autonomous Systems, 2010, 8(2/3/4):190-216.

Bakker, et al., Tyre Modelling for Use in Vehicle Dynamics Studies, No. 870421, SAE Technical Paper, 1987, 15 pages.

Brown, et al., Safe Driving Envelopes for Path Tracking in Autonomous Vehicles, Control Engineering Practice, 2017, 61:307-316.

Chakraborty, et al., Time-Optimal Vehicle Posture Control to Mitigate Unavoidable Collisions Using Conventional Control Inputs, American Control Conference, 2013, pp. 2165-2170.

Di Cairano, et al., Vehicle Tracking Control on Piecewise-Clothoidal Trajectories by MPC with Guaranteed Error Bounds, In 2016 IEEE 55th Conference on Decision and Control (CDC), pp. 709-714.

Erlien, et al., Safe Driving Envelopes for Shared Control of Ground Vehicles, IFAC Proceedings Volumes, 2013, 46 (21):831-836.

Febbo, et al., Moving Obstacle Avoidance for Large, High-Speed Autonomous Ground Vehicles, IEEE, 2017, In American Control Conference (ACC), pp. 5568-5573.

Heydinger, et al., Measured Vehicle Inertial Parameters-NHTSA's Data Through Nov. 1998, SAE Transactions, 1999, No. 1999-01-1336, 33 pages.

Kapania, et al., Design of a Feedback-Feedforward Steering Controller for Accurate Path Tracking and Stability at the Limits of Handling, Vehicle System Dynamics, 2015, 53(12):1687-1704.

Kreisselmeier, et al., Systematic Control Design by Optimizing a Vector Performance Index, In Computer Aided Design of Control Systems, 1980, pp. 113-117.

Laurense, et al., Path-Tracking for Autonomous Vehicles at the Limit of Friction, IEEE, 2017, In 2017 American Control Conference (ACC), pp. 5586-5591.

Liu, et al., A Study on Model Fidelity for Model Predictive Control-Based Obstacle Avoidance in High-Speed Autonomous Ground Vehicles, Vehicle System Dynamics, 2016, 54(11):1629-1650.

Liu, et al., Combined Speed and Steering Control in High-Speed Autonomous Ground Vehicles for Obstacle Avoidance Using Model Predictive Control, IEEE Transactions on Vehicular Technology, 2017, 66(10):8746-8763.

Liu, et al., A Nonlinear Model Predictive Control Formulation for Obstacle Avoidance in High-Speed Autonomous Ground Vehicles in Unstructured Environments, Vehicle System Dynamics, 2018, 56(6):853-882.

Liu, et al., Improving the Robustness of an MPC-Based Obstacle Avoidance Algorithm to Parametric Uncertainty Using Worst-Case Scenarios, Vehicle System Dynamics, 2019, 57(6):874-913.

Park, et al. Obstacle Avoidance of Autonomous Vehicles Based on Model Predictive Control, Proceedings of the Institution of Mechanical Engineers, Part D: Journal of Automobile Engineering, 2009, 223(12):1499-1516.

Peng, et al., Comparison of Various Double-Lane Change Manoeuvre Specifications, Vehicle System Dynamics, 2012, 50(7):1157-1171.

Richards, Fast Model Predictive Control with Soft Constraints, European Journal of Control, 2015, 25:51-59.

U.S. Department of Transportation, Federal Highway Administration, Speed Concepts: Informational Guide, Sep. 2009, 59 pages.

Wachter, et al., On the Implementation of an Interior-Point Filter Line-Search Algorithm for Large-Scale Nonlinear Programming, Mathematical Programming, 2006, 106(1):25-57.

Wurts, et al., Collision Imminent Steering Using Nonlinear Model Predictive Control, American Control Conference, 2018, 6 pages.

Wurts, et al., Increasing Computational Speed of Nonlinear Model Predictive Control Using Analytic Gradients of the Explicit Integration Scheme with Application to Collision Imminent Steering, IEEE Conference on Control Technology and Applications, 2018, 6 pages.

* cited by examiner

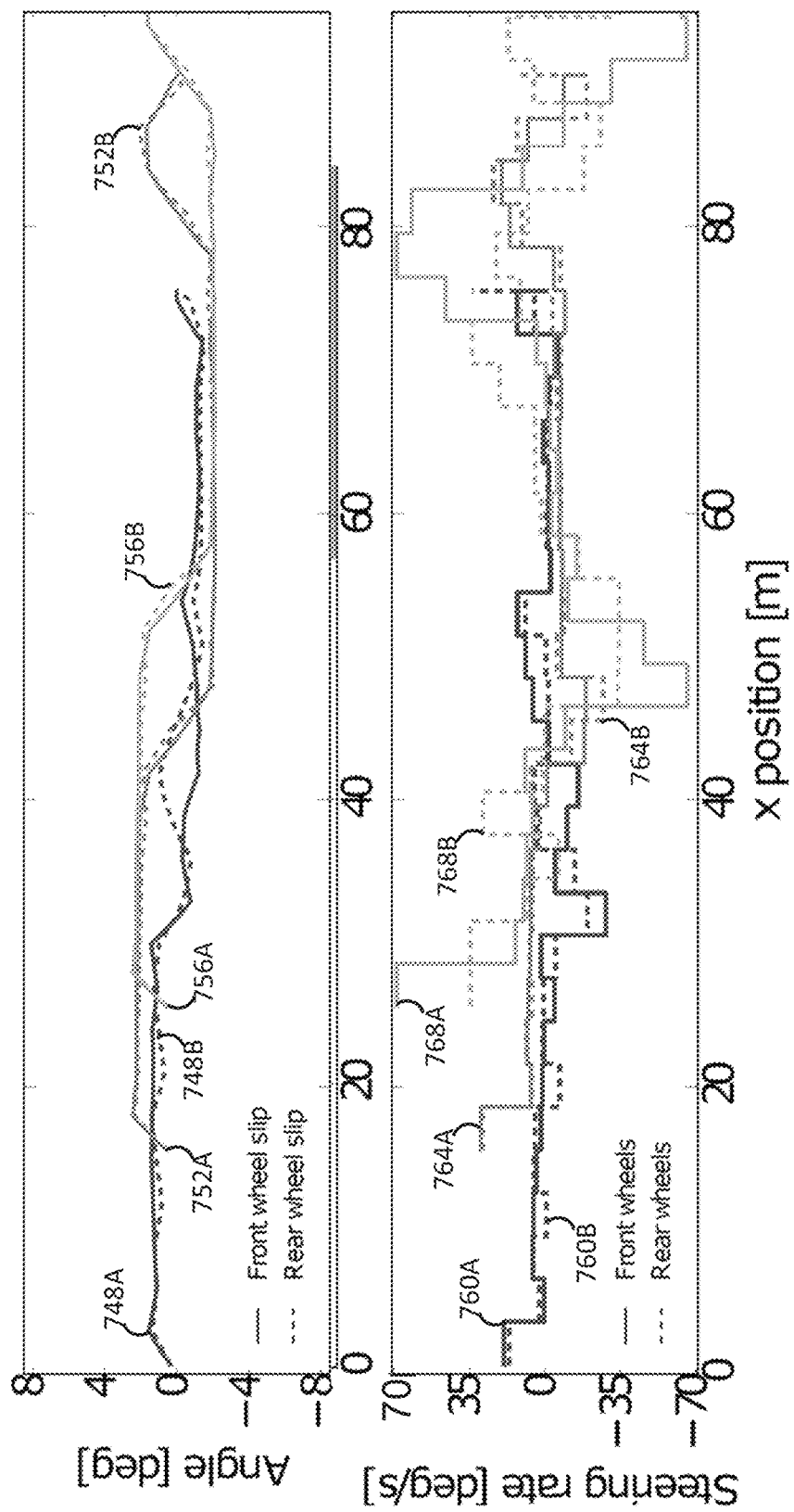

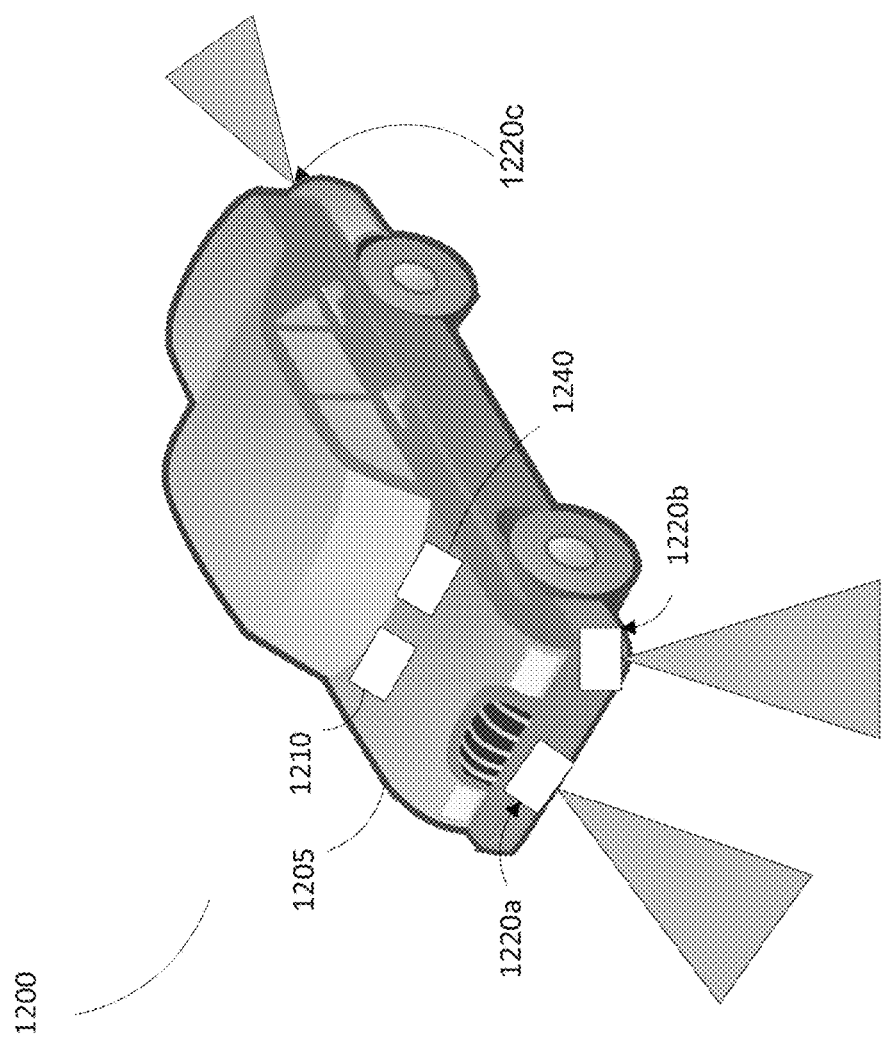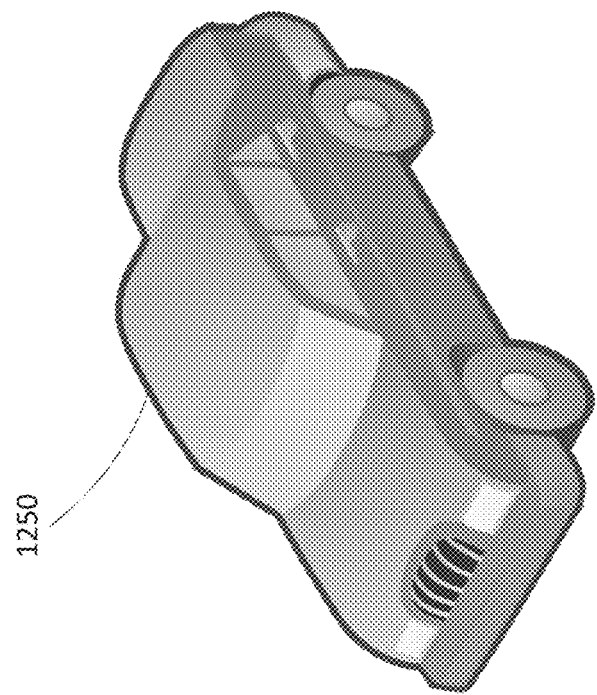
FIG. 12

LANE CHANGE MANEUVERS WITH MINIMIZED TIRE SLIP

CROSS-REFERENCES TO RELATED APPLICATIONS

Not Applicable.

STATEMENT REGARDING FEDERALLY SPONSORED RESEARCH

Not Applicable.

BACKGROUND OF THE INVENTION

1. Field of the Invention

This invention relates to systems and methods for performing lane change maneuvers in a vehicle to avoid an obstacle, specifically how to perform such maneuvers with minimized tire slip.

2. Description of the Related Art

Collision imminent steering is an automotive active safety feature designed to perform an aggressive lane change to avoid a forward collision in the event that the system determines there is insufficient distance to avoid a collision by braking alone. Some methods for collision imminent steering may push a vehicle to its dynamic limits.

Therefore, what is needed is an improved method for collision imminent steering to allow vehicles to avoid objects.

SUMMARY OF THE INVENTION

The present disclosure provides a method of performing a lane change maneuver in a vehicle to avoid an object, the lane change maneuver having a minimized maximum tire slip experienced throughout the execution of the lane change maneuver.

In one aspect, a method in a data processing system including at least one processor and at least one memory, the at least one memory including instructions executed by the at least one processor to implement a lane change system is provided by the present disclosure. The method includes receiving, from at least one of a plurality of sensors coupled to a vehicle, information associated with a location of an object longitudinally ahead of the vehicle, determining a sequence of control inputs to avoid a collision between the vehicle and the object based on a constraint and the location of the object, the sequence of control inputs being associated with a time horizon, and the determining the sequence of control inputs including minimizing a maximum tire slip angle of the vehicle during the time horizon subject to the constraint, and causing a vehicle control system of the vehicle to perform a vehicle maneuver based on the sequence of control inputs.

The method may further include calculating a first sequence of tire slip values associated with the time horizon and a front wheel of the vehicle, and calculating a second sequence of tire slip values associated with the time horizon and a rear wheel of the vehicle. In the method, each tire slip angle may be calculated based on a lateral velocity of the vehicle, a yaw rate of vehicle, a distance of the associated wheel to a center of gravity of the vehicle, and a longitudinal velocity of the vehicle. In the method, the first tire slip sequence may be associated with a sequence of front steering angle values of the front wheels of the vehicle and a sequence of lateral velocity values of the vehicle corresponding to the sequence of front steering angle values, and the constraint may include a first constraint requiring that a final front steering angle value in the sequence of front steering angle values is no greater than a first predetermined value and a second constraint requiring that a final lateral velocity value in the sequence of lateral velocity values is equal to a second predetermined value. The first predetermined value may be two degrees and the second predetermined value may be one-tenth of a meter per second. The method may further include calculating a score for the first sequence of tire slip angles and the second sequence of tire slip angles based on a maximum allowable slip value.

The method may further include determining a longitudinal distance between the vehicle and the object based on the information.

In the method, the constraint may include a minimum lateral distance to be maintained between the object and the vehicle at a longitudinal location of the object.

In the method, the vehicle control system may include a steering subsystem configured to steer front wheels of the vehicle, and the constraint may include a steering rate limit for the steering subsystem.

The method may further include receiving, from at least one of the plurality of sensors, roadway information about a roadway the vehicle is traveling on, and determining a lane boundary of a roadway based on the roadway information, and the constraint may include a requirement that a predetermined portion of the vehicle must remain on a side of the lane boundary.

In another aspect, a method in a data processing system including at least one processor and at least one memory, the at least one memory including instructions executed by the at least one processor to implement a lane change system is provided by the present disclosure. The method includes receiving, from at least one of a first plurality of sensors coupled to a vehicle, first information about a roadway, receiving, from at least one of the first plurality of sensors, second information about a location of an object, determining a drivable region based on the first information and the second information, the drivable region including a boundary, determining a sequence of control inputs to avoid a collision between the vehicle and the object based on a constraint, the location of the object, and the boundary, the sequence of control inputs being associated with a time horizon, and the determining the sequence of control inputs including minimizing a maximum tire slip angle of the vehicle during the time horizon subject to the constraint, and causing a vehicle control system of the vehicle to perform a vehicle maneuver based on the first sequence of control inputs.

In the method, the determining the drivable region may include determining a curvature of the roadway based on the first information, and determining the boundary based on the curvature and a predetermined width of the vehicle.

In the method, the drivable region may include a plurality of polygons, and a side of each polygon may be included in the boundary.

In the method, the first sequence of control inputs may include a sequence of steering rates for a front wheel of the vehicle.

In the method, the boundary may be a right boundary included in the drivable region, and the drivable region may include a left boundary, and the constraint may include that a requirement that a portion of the vehicle stays within the right boundary and a requirement that the center of the ego vehicle stay within the left boundary.

In the method, the second information may include information about the object that is located longitudinally ahead of the vehicle.

In the method, the first tire slip sequence may be determined using a nonlinear optimization technique.

In yet another aspect, a driving control system for a vehicle including a vehicle control system configured to steer front wheels of the vehicle, the driving control system is provided by the present disclosure. The system includes a plurality of sensors coupled to the vehicle, and a controller in electrical communication with the first plurality of sensors and the vehicle control system, the controller being configured to execute a program to receive first information about a roadway from at least one of the plurality of sensors, receive second information about a location of an object from at least one of the plurality of sensors, determine a drivable region based on the first information and the second information, the drivable region including a boundary, determine a sequence of control inputs to avoid a collision between the vehicle and the object based on a constraint, the location of the object, and the boundary, the sequence of control inputs being associated with a time horizon, and the determining the sequence of control inputs including minimizing a maximum tire slip angle of the vehicle during the time horizon subject to the constraint, and cause the vehicle control system of the vehicle to perform a vehicle maneuver based on the sequence of control inputs.

The system may further include determining the object is located longitudinally ahead of the vehicle.

In the system, the first sequence of control inputs may include a sequence of steering rates for a front wheel of the vehicle and the controller may be further configured to execute the program to calculate the sequence of tire slip angles, the sequence of tire slip angles including a sequence of tire slip angles corresponding the front wheel, and the constraint including that a steering angle of the front wheel at a final tire slip angle in the first sequence of tire slip angles is equal to a first predetermined value.

These and other features, aspects, and advantages of the present invention will become better understood upon consideration of the following detailed description, drawings and appended claims.

BRIEF DESCRIPTION OF THE DRAWINGS

FIG. 7C shows the front and rear slip angles of various maneuvers at various distances from the obstacle of FIG. 7A.

FIG. 7D shows the front and rear steering rates of various maneuvers at various distances from the obstacle of FIG. 7A.

FIG. 12 shows an exemplary embodiment of a driving control system.

DETAILED DESCRIPTION OF THE INVENTION

Figure 1:
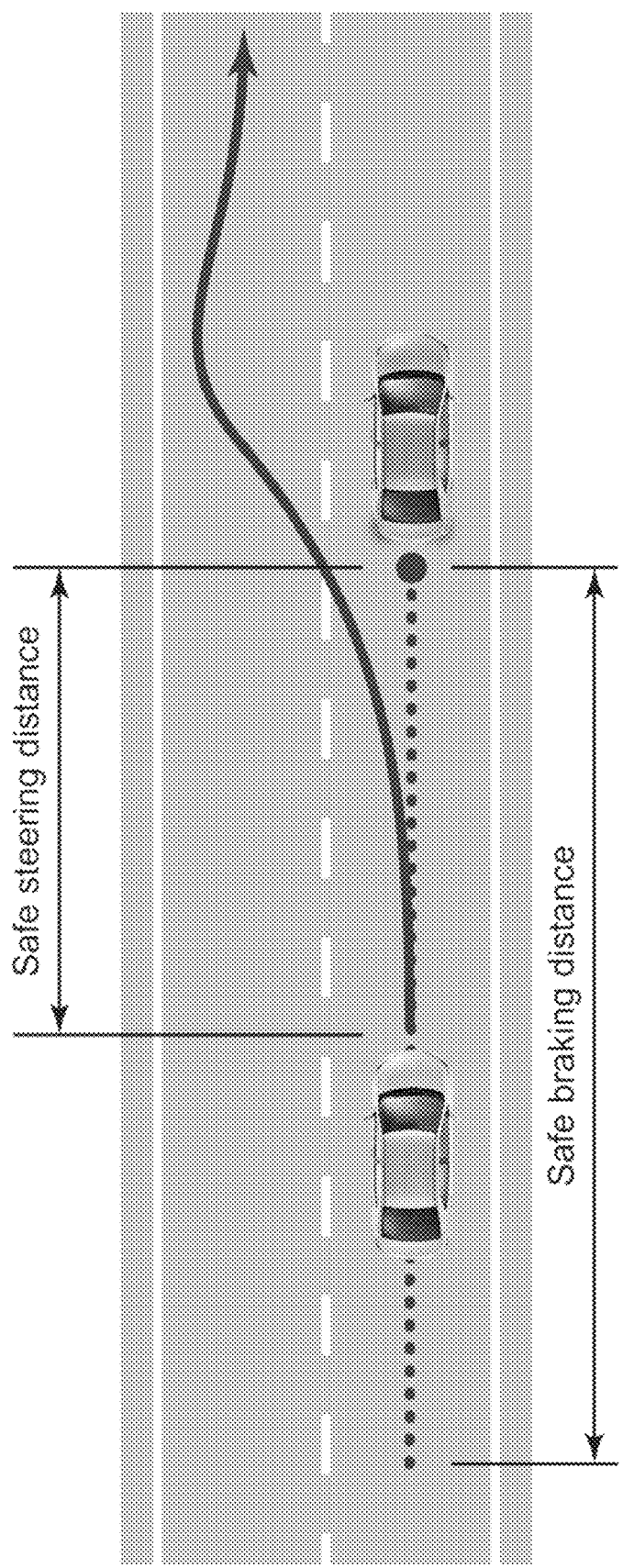
FIG. 1 shows a topographical view of a successful lane change

Elements of this disclosure could provide new consumer protections by providing a method for a collision imminent steering maneuver with minimized maximum tire slip.

A. Collision Imminent Steering at High Speed Using Nonlinear Model Predictive Control Collision imminent steering is an automotive active safety feature designed to perform an aggressive lane change to avoid a forward collision in the event that the system determines there is insufficient distance to avoid a collision by braking alone. In this disclosure, a collision imminent steering system is developed using nonlinear model predictive control to perform a lane change at high speed in a highway environment. Two formulations are presented: one formulation to show the theoretical minimum lane change distance within which a safe lane change can be performed, and a second formulation to find the minimum aggressive maneuver for a given lane change distance. Further below, a formulation to extend the minimum slip formulation to curved roads is also presented. The nonlinear model predictive control formulation is posed as a constrained optimization problem, where solutions obey hard safety constraints of the highway environment. Constraint aggregation techniques are analyzed and introduced to monitor the peak tire slip throughout the maneuver. Numerical simulations are performed for a typical luxury sedan and show that the minimum distance achievable with the developed formulation is 31 m in contrast to a braking distance of 57 m. Hence, there is a window of feasibility where the vehicle cannot avoid collision by braking alone, but can change lanes safely and maintain a safe trajectory throughout the maneuver.

Additional simulations show that an active four wheel steering architecture can improve performance over front only steering.

INTRODUCTION

Automotive active safety refers to systems that actively intervene or alert the driver in safety critical situations. Active safety features include adaptive cruise control, lane departure warning, and collision imminent braking, to name a few. As sensor and embedded computing technology improve, more sophisticated active safety algorithms can be implemented. One such emerging active safety feature is collision imminent steering (CIS), which corresponds to performing a lane change maneuver when a forward collision cannot be avoided by braking alone.

CIS belongs to a larger family of control problems, often referred to as obstacle avoidance, which has been well studied. Obstacle avoidance strategies incorporate various formulation and solution strategies that are briefly reviewed next.

Early implementations of obstacle avoidance used a two-level architecture to solve for an optimal state trajectory in the first level, and then solve for a control input to follow that state trajectory in the second level. One approach to solving for an optimal state trajectory is to represent the drivable environment as an energy potential field, and obstacles in the field as areas of high energy [1]. By including a starting point and desired end point, an optimal state trajectory is generated by minimizing the energy, thus pushing the vehicle away from obstacles. Using this state trajectory as the reference, a lower level controller, such as a PID, can then navigate the vehicle to follow the generated trajectory [2].

There are two primary drawbacks to using potential energy methods to generate a reference trajectory. First, the appropriate weightings used to generate the potential energy field are not known a priori, as they depend on the scenario. Second, potential energy methods cannot distinguish difficult to navigate trajectories from infeasible trajectories that violate safety constraints. Thus, for safety critical situations, hard safety constraints are preferable [3].

Further, Proportional-integral-derivative (PID) controllers cannot guarantee the satisfaction of the safety constraints, either. Specifically, PID controllers cannot control the magnitude or position of state trajectory following error, thus cannot ensure the safety of the host vehicle, especially when the CIS maneuver needs to push the vehicle to its dynamic limits.

To address the shortcomings of simple low-level controllers, advanced controllers have been implemented to capture system nonlinearities. For example, feedback-feedforward controllers can incorporate estimated future state information into current control input and greatly improve tracking error as demonstrated on a performance race car that could successfully follow the optimal racing line through a race course at high speed [4]. However, this method still requires a known reference trajectory, which is not available for a CIS maneuver. Additionally, following a pre-computed optimal reference trajectory does not always push the vehicle to its dynamic limits, as the optimal trajectory changes dynamically as the vehicle deviates from the reference path [5].

A critical drawback to a two-level architecture is the difficulty of determining an optimal trajectory that is drivable at the limits of handling. One approach to ensuring drivability is implementing pseudo vehicle dynamic constraints based on peak accelerations achieved in testing [6]. While this is a step towards ensuring drivability, it does not guarantee that the sequence of vehicle accelerations, as specified by the trajectory planner, is drivable.

For the CIS maneuver to guarantee drivability, especially at the limits of handling, a one-level architecture has been pursued. In a one-level architecture, a control trajectory is generated such that the corresponding predicted state trajectory obeys the system dynamics and constraints directly. Nonlinear model predictive control (MPC) is a common approach to solving the joint control and state trajectory optimization problem. For example, nonlinear MPC has been shown to navigate autonomous vehicles through unstructured environments, subject to hard collision avoidance constraints [7], [8]. In particular, it has been shown that nonlinear MPC can appropriately push the vehicle to its dynamic limits of handling and achieve safe obstacle avoidance in an open environment. However, these references focus on avoiding vehicle roll over, as indicated by tire lift off, in large military vehicles, and did not develop the controller to perform an optimal CIS maneuver.

Alternative approaches use nonlinear MPC focused on passenger scale automobiles for collision mitigation. For example, T-bone mitigation maneuvers have been examined using nonlinear MPC [9], where the optimization minimizes the time required to rotate the vehicle 90°, thus achieving side-side collision. A one-level MPC architecture is given the initial vehicle state and desired final vehicle state, and solves for a sequence of control inputs, and corresponding state trajectory, that minimizes the time to rotate the vehicle. While this approach maintains the control trajectory and state trajectory consistency requirement at high speeds, hard constraints on the vehicle trajectory are not enforced outside the boundary conditions.

Specific to a lane change maneuver, MPC has been used in one-level architectures to solve the joint control and state trajectory optimization problem. For example, in [10], a host vehicle performs a double lane change maneuver, where it changes into an adjacent lane and then returns to the initial lane. The MPC solution is used as a blending indicator for mixed human-autonomous control at low-speeds. While the controller properly accounts for system dynamics and hard safety constraints, the system dynamics are a linearized model specific for low-speed, which intentionally avoids pushing the vehicle to its dynamic limits.

The CIS system presented in this disclosure has two key contributions over the state-of-the-art reviewed above. First, hard safety constraints are developed based on a highway driving environment that ensure that the trajectory is feasible through the entire maneuver. Second, a one-level nonlinear MPC architecture is developed that can either minimize the distance needed to change lanes or minimize the aggressiveness experienced throughout the maneuver. The MPC formulation is solved using gradient based optimization; thus the corresponding objective function and constraints are all developed to be at least $C^2$ smooth. A preliminary version of this work has been presented in [11], which only addressed the theoretical minimum distance formulation to estimate the shortest possible distance a vehicle can safely change lanes. Compared to that previous reference, some additional contributions of this disclosure are two-fold: (1) a refined minimum distance formulation using advanced constraint aggregation techniques, and (2) a new CIS maneuver formulation that minimizes the aggressiveness of the lane change.

The remainder of Section A. of the disclosure is structured as follows. The highway driving environment and scaling for simulation environment, as well as details the system dynamics and parameters to model the host vehicle is detailed. The optimal control problem, including objective function and constraints used in numerical optimization is then derived. The simulation results, and the key takeaways are then presented.

Figure 2:
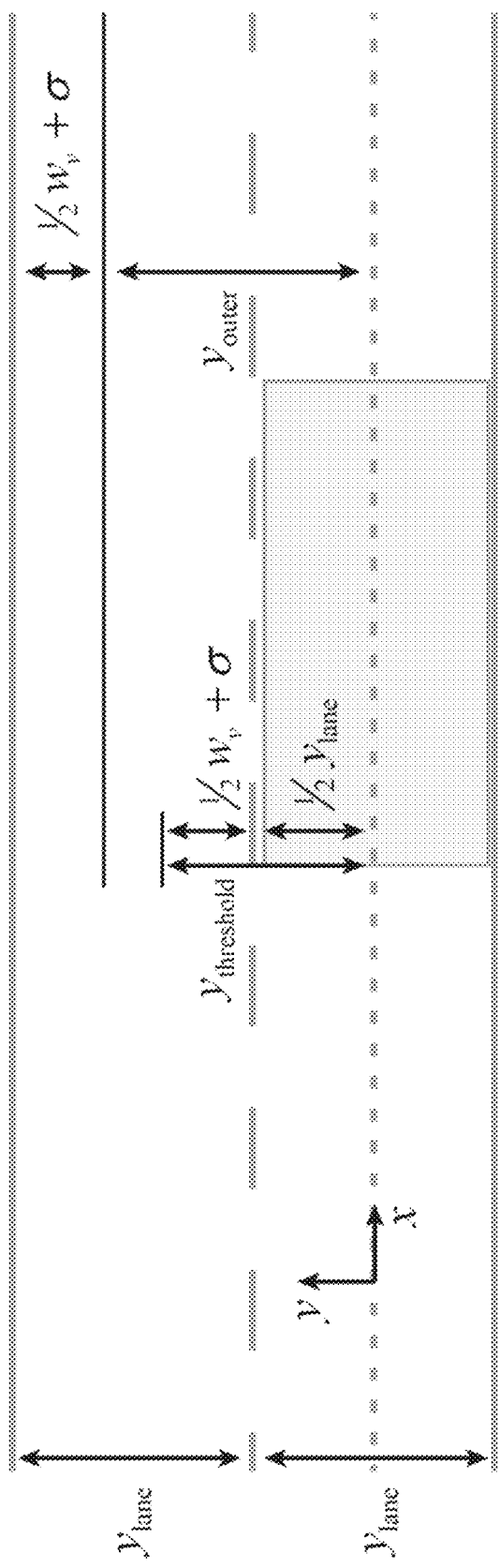
FIG. 2 shows a definition of the lane widths and safe driving boundaries.

FIG. 1 shows a topographical view of a successful lane change. The host vehicle starts at the left side of the image and travels to the right. The vehicle's center of gravity trajectory is depicted as a solid green line. The host vehicle clears the starting lane boundary before passing the obstacle, stays within the second lane outer boundary, and has a stable trajectory at the end of the maneuver. FIG. 2 shows a definition of the lane widths and safe driving boundaries.

Highway Driving Environment and Vehicle Model

The highway driving setting is the most common application of a CIS maneuver due to the high speeds permitted in such environments. However, the scale of highway settings makes the CIS maneuver difficult to solve due to the constraints of allowable driving space. In this section, a typical highway road is analyzed and the safe driving boundaries are characterized first. Then, the vehicle model used in the CIS algorithm is described.

Highway Environment

To be considered successful within the context of this work, a CIS maneuver must satisfy three key constraints: (1) the host vehicle must have completely cleared the obstacle when passing alongside said obstacle; (2) the host vehicle must remain inside the outer lane boundary during the entire maneuver; (3) and the host vehicle must remain stable throughout the maneuver with the final predicted state being centered in the next lane, heading with a pure longitudinal velocity.

A successful lane change is depicted in FIG. 1. In the depicted scenario, the host vehicle is in the right lane of a two lane highway, with both lanes traveling in the same direction, which is to the right. It is assumed that before a CIS maneuver is initiated, a higher level decision on whether or not to initiate the lane change is evaluated by a supervisory system, which would take into account lane occupancy.

The vehicle model used in the nonlinear MPC tracks only the vehicle's center of gravity (CG) when evaluating vehicle position. Therefore the lane boundary information must be transformed to be relevant in the context of vehicle CG. This is done as illustrated in FIG. 2 and explained below.

Consider first the painted lane boundary dimensions. Per United States building code, the minimum allowable highway width is 3.7 m [12]. For the proposed scenario, the width is set at $y_{lane}=3.7$ m for both lanes, although it is appreciated that in a real-world implementation, the lane width of one or both lanes could be determined using information received from sensors coupled to a vehicle. It is worth noting, however that the algorithm is applicable to variable and uneven lane widths, and can update the CIS maneuver to use lane boundary information obtained from other sources, such as vision based systems.

For the proposed scenario, the host vehicle starts centered in its own lane, heading straight down the road, however, in a real-world implementation, the host vehicle could start at any starting state, i.e. any location in its own lane. A global coordinate frame is used, where the origin is centered at the vehicle's starting position. The x direction represents distance traveled along the highway, and y direction represents lateral displacement from the center of the right lane.

Recall that the first criterion for a successful lane change is that the host vehicle must completely change lanes when passing the obstacle. To capture this requirement in the formulation, the following threshold is defined $$y_{threshold} := \tfrac{1}{2} y_{lane} + \tfrac{1}{2} w_v + \sigma \quad (1)$$

where $w_v$ is the width of the vehicle as defined in Table I and $\sigma$ is a safety margin introduced to capture corner clipping on the vehicle side. Corner clipping occurs when the vehicle's CG is appropriately in the lane, but due to vehicle rotation, the vehicle corners extend into the original lane, thus violating a complete lane change. Numerical simulation has shown $\sigma=0.5$ m to sufficiently avoid clipping, however other values may be used in a real-world implementation.

The second criterion for a CIS maneuver is that the vehicle must remain inside the outer lane boundary throughout the entire maneuver. To this end, the following outer boundary is defined for the center of gravity of the host vehicle.

$$y_{outer} := \tfrac{3}{2} y_{lane} - \tfrac{1}{2} w_v - \sigma \quad (2)$$

The safety criterion is then enforced by ensuring that the y position of the host vehicle does not exceed $y_{outer}$ throughout the maneuver.

The third criterion is based on stability constraints, ensuring the vehicle retains reliable control of the tire-road interaction and is stable in the middle of the next lane at the end of the maneuver. The stability constraint ensures the maneuver does not push the tires beyond their peak traction and into the relaxation region, as control authority can be quickly lost and mid-maneuver adjustments cannot reliably be made [8]. The requirement of a stable vehicle in the middle of the next lane at the end of the prediction horizon ensures the controller has calculated the maneuver all the way through to the end, avoiding the initiation of a partial maneuver that leaves the vehicle vulnerable and potentially unrecoverable as the prediction horizon recedes.

Vehicle Model

One emerging feature among luxury sedans is the use of active four wheel steering. In four wheel steering, the rear wheels are allowed to steer independent of the front by actuators controlled purely by an on-board computer. Active four wheel steering is used in luxury sedans to improve ride quality and maneuverability, but it can also improve driving performance. For example, it has been shown active four wheel steering can improve vehicle tracking performance over conventional front steering [16]. Thus, the formulation used in this work is developed to allow for four wheel steering, but front wheel only steering is considered, as well, by constraining the rear wheel steering angle to zero.

The host vehicle is modeled using a 3DoF bicycle model with nonlinear tire forces based on the Pacejka tire model [13]. This model has been previously shown to be sufficiently accurate for nonlinear MPC when obstacles are not excessively wide [14]. The model is parameterized after a luxury sedan, as this class of personal vehicles is the most common to introduce new active safety features and advanced hardware architectures. The vehicle parameters for the 3DoF model are reported in Table I below. Most of the parameters relevant to the 3DoF model are readily available from the manufacturer's specification sheet for the vehicle, and other values can be readily estimated [15]. Specifically, Vehicle mass, Weight Distribution, Wheel Base, and Vehicle Width are available form the manufacturer, and Front Wheel to CG distance, Rear Wheel to CG distance, and Yaw moment of inertia can be derived using methods known in the art.

TABLE I

| Vehicle Parameter | Parameter Symbol | Value |
|---|---|---|
| Vehicle mass | m | 2041 kg |
| Weight Distribution | — | 51.4/48.6 F/R |
| Wheel Base | — | 3.2 m |
| Vehicle Width | $w_v$ | 1.8 m |
| Front Wheel to CG distance | $l_f$ | 1.56 m |
| Rear Wheel to CG distance | $l_r$ | 1.64 m |
| Yaw moment of inertia | $I_{zz}$ | 4964 kg m$^2$ |

Braking and forward accelerations are not allowed during the CIS maneuver in this work in accordance with lane-change performance testing standards [17]. This simplification also avoids complex temporal information in the fitness of a CIS maneuver. As a result, the vehicle's forward velocity is fixed, and simplifications are made to eliminate longitudinal acceleration. Separate numerical simulations showed longitudinal accelerations to be small and their effects negligible. For the proposed highway scenario, the vehicle travels at 30 m/s (67 mph), which is a reasonable highway speed in the United States. However, it is understood that the methods presented are compatible with other vehicle speeds, such as speeds from about 45 MPH to about 85 MPH. Thus, the resulting vehicle model is described by $$x = \begin{bmatrix} \text{global } x \text{ position [m]} \\ \text{global } y \text{ position [m]} \\ \text{vehicle yaw [rad]} \\ \text{longitudinal velocity } \left[\frac{m}{s}\right] \\ \text{lateral velocity } \left[\frac{m}{s}\right] \\ \text{yaw rate } \left[\frac{rad}{s}\right] \\ \text{front steering angle [rad]} \\ \text{rear steering angle [rad]} \end{bmatrix} = \begin{bmatrix} x \\ y \\ \psi \\ u \\ v \\ \omega \\ \delta_f \\ \delta_r \end{bmatrix} \quad (3)$$

$$u = \begin{bmatrix} \text{front steering rate } \left[\frac{rad}{s}\right] \\ \text{rear steering rate } \left[\frac{rad}{s}\right] \end{bmatrix} = \begin{bmatrix} \dot{\delta}_f \\ \dot{\delta}_r \end{bmatrix} \quad (4)$$

$$\frac{dx}{dt} = \begin{bmatrix} u\cos(\psi) - v\sin(\psi) \\ u\sin(\psi) + v\cos(\psi) \\ \omega \\ 0 \\ -u\omega + \frac{(F_{y,f}\cos(\delta_f) + F_{y,r}\cos(\delta_r))}{m} \\ \frac{(F_{y,f}\cos(\delta_f)l_f - F_{y,r}\cos(\delta_r)l_r)}{I_{zz}} \\ \dot{\delta}_f \\ \dot{\delta}_r \end{bmatrix} \quad (5)$$

where states are captured in (3), control inputs in (4), and equations of motion in (5). The nonlinear system dynamics in (5) use the nonlinear tire forces, denoted $F_y$. The tire forces are captured using the Pacejka magic tire formula.

$$F_y = \mu F_z \sigma_y$$

$$\sigma_y = -\sin(C \arctan(B V_y / V_x))$$

$$V_x = u \cos(\delta) + (v + \omega l)\sin(\delta)$$

$$V_y = u \sin(\delta) + (v + \omega l)\cos(\delta) \quad (6)$$

The magic tire formula relies on multiple parameters to capture the appropriate force curve. These parameters are not published, but can be inferred from tire performance. The parameters are tuned to represent a tire with 0.8 g peak traction, a peak lateral force at 12° slip, and 10% force relaxation at high slip angles. The parameters used in (6) are listed in Table II. The parameter l is taken as $l_f$ for front tire forces and $-l_r$ for rear tire forces to appropriately capture vehicle yaw rate.

Equations (3-6) completely capture the system dynamics, which forms the basis for the predicted trajectory used in MPC. In the next section, the numerical optimization problem is formed and the corresponding objective function and constraints are described.

Optimal Control Problem and Model Predictive Control Formulation

The MPC formulation in this work uses a direct shooting method numerically integrated using forward Euler integration and is solved by (7).

$$x(t_{i+1}) = x(t_i) + t_s \frac{dx}{dt}\bigg|_{t=t_i} \quad (7)$$

$$x(t_0) = [0 \ 0 \ 0 \ u_0 \ 0 \ 0 \ 0 \ 0]^T$$

The vehicle starts centered in its own lane at the origin, heading straight down the lane with wheels straight ahead. The vehicle velocity starts at $u_0$, which can be set to model various highway speeds.

For the proposed MPC formulation, the fitness and feasibility of a control trajectory is dependent on the fitness and feasibility of the corresponding state trajectory. This forms two stages to the numerical integration scheme: the propagation of the system dynamics forward to the next time integration point, and the evaluation of that state against the CIS criteria.

There are three key time parameters relevant to the MPC formulation used in this work. First, the control trajectory is broken into segments, where each segment has a constant control rate, representing a zero-order hold. The use of constant control segments is consistent with automotive control architectures using loop timing. In loop timing control schemes, a central controller issues a command to the subsystems at fixed timing intervals. For the simulations in this disclosure, a time interval of $t_c$=100 ms is used.

TABLE II

| Tire Parameter | Parameter Symbol | Value |
|---|---|---|
| Coefficient of Friction | μ | 0.8 |
| Tire Property | B | 13 |
| Tire Property | C | 1.285 |
| Tire Longitudinal Velocity | $V_x$ | |
| Tire Lateral Velocity | $V_y$ | |

Second, inside the control interval, the system dynamics evolve according to the explicit integration scheme. In general, the time integration step should be an integer divisor of the control interval. For the forward Euler integration used in this scenario, time steps are set at $t_s$=10 ms, because offline analysis for this simulation showed that time steps below 10 ms had diminishing returns in accuracy.

Third, the system must look ahead some set period in the future, denoted by the time horizon. Identifying the proper time horizon is an open question in MPC. If the time horizon is too short, the system dynamics will not have sufficient time to perform a feasible CIS maneuver. If the time horizon is too long, there is unnecessary computational complexity. Numerical tests have shown a time horizon of $t_h$=2.5 s to be sufficient to perform this CIS maneuver, however time horizons can be between about one second and about ten seconds. Based on this time horizon, the control trajectory is defined as 25 constant control inputs, with each control input consisting of a front and rear steering rate.

Two optimization formulations are presented below. The first one aims to find the minimum distance to perform an aggressive lane change. This formulation is useful in determining the theoretical limits for performing a CIS maneuver, i.e., the shortest distance to the obstacle for which a CIS maneuver can still be performed safely. The second one seeks to minimize the aggressiveness of the maneuver and is useful for initiating the CIS anywhere within the theoretical limits identified by the first formulation. To this end, a maneuver's aggressiveness is evaluated as the peak tire slip throughout the entire maneuver. The peak tire slip is a crude estimate of aggressiveness, because higher slip angles relate to higher tire forces, which cause higher accelerations on the passengers. Thus, the fitness of a CIS maneuver in the second formulation is the maximum tire slip felt at the front or rear tires throughout the maneuver, and the corresponding objective function is to minimize the maximum of the front or rear tire slip.

In gradient based optimization, maximum and minimum functions should be avoided, as these introduce discrete step functions, which cause gradient issues. Previous research uses switching quadratic functions for constraint aggregation, but these are not ideal, as no gradient information is retained when the constraint is inactive, and they do not scale to minimizing the maximum tire slip [11]. To address this, modern constraint aggregation techniques are leveraged as described next.

KS Constraint Aggregation

The Kreisselmeier-Steinhauser (KS) function was proposed as a means of creating a single performance metric to represent a group of performance indicators [18]. The discrete KS function is introduced as follows.

$$KS(g, \rho) = \frac{1}{\rho}\ln\left(\sum_{i=1}^{n} e^{\rho g_i}\right) \quad (8)$$

In (8), g represents a vector of constraints, with $g_i$ being the $i^{th}$ constraint value. For the purposes of this MPC formulation, $g_i$ represents the constraint value at the $i^{th}$ time integration step, g represents the constraint vector over the prediction horizon, and $\rho$ represents the constraint aggregation curvature parameter. The KS function has a few key properties that are desirable for safety constraint aggregation [19]. Specifically, it has been shown that the KS function is a conservative aggregation, and as p becomes large the aggregation approaches the maximum value. These are numerically represented as follows.

$$KS(g, \rho) \geq \max(g_i) \forall\, i \in [1, n] \quad (9a)$$

$$\lim_{\rho \to \infty} KS(g, \rho) = \max(g_i) \forall\, i \in [1, n] \quad (9b)$$

$$\max(g_i) \leq KS(g, \rho) \leq \max(g_i) + \frac{\ln(n)}{\rho}$$

The significance of the conservative aggregation can be seen from (9a); if the KS aggregation obeys the constraint, than each component of g obeys the constraint as well. In terms of the CSI maneuver, if the KS aggregation of the outer lane boundary constraint is satisfied, then each integration point will obey the lane boundary constraint.

While the conservative nature of the KS function is important at a theoretical level, there are practical limitations to using the KS function. Because the KS function is conservative, the aggregation will be larger than the maximum of g. For the lane boundary constraint, if $KS(g,\rho)$= $y_{outer}$, then $\max(g_i) < y_{outer}$. If $KS(g,\rho)=y_{outer}$ and r is small, then $\max(g_i)$ can be much less than $y_{outer}$ by (9c). This can cause the controller to be overly conservative of the lane boundary constraint, thus not achieving good CIS performance.

Large values of $\rho$ can cause numerical difficulties depending on the sign of the elements of g. For example, the outer lane boundary has a positive constraint value; thus $$\lim_{\rho \to \infty} e^{\rho g_i} = \infty,$$

which causes numerical difficulties. Using algebraic manipulation, a shifted KS aggregation formulation can be used.

$$KS(g, \rho, \bar{g}) = \bar{g} + \frac{1}{\rho}\ln\left(\sum_{i=1}^{n} e^{\rho(g_i - \bar{g})}\right) \quad (10)$$

(10) is identical to (8), but is numerically robust. By choosing $\bar{g}=\max(g_i)$, the exponent is non-positive, thus avoiding overflow errors. Additionally, the shifted form of (10) provides insight into the maximum overestimation seen in (9c). If $\bar{g}$ is taken as $\max(g_i)$, the largest feasible value of $(g_i-\bar{g})$ is 0. If $g_i=\max(g_i)\ \forall i \in [1,n]$, then (10) is equivalent to $$KS(g, \rho, \max g_i)) = \max(g_i) + \frac{1}{\rho}\ln(ne^0),$$

which reduces to the third property.

However, evaluating $\max(g_i)$ requires storing all values of $g_i$, iterating through the list for the maximum value, then evaluating the KS aggregation. This can be computationally expensive. Alternatively, as the controller propagates the predicted state trajectory, the controller can store the incremental KS contribution for a fixed $\bar{g}$. Calculating the incremental KS contribution at each time step has the additional benefit that the entire prediction horizon does not need to be stored, only the state at the active time step.

While choosing $\bar{g}$ is not obvious, choosing g as the peak allowable constraint value is a good starting point. If a solution to the numerical optimization problem exists, the starting design point is in the neighborhood of the feasible region, and values of ρ are reasonable, then the nested exponent does not encounter overflow issues and hence retains the aggregate value and gradient information. Establishing reasonable values of ρ for the different constraints is discussed in III-I. The primary advantage to setting $\bar{g}$ to the constraint limit is the constraint limit is established prior to generating the trajectory. Thus, this approach avoids having to store every instance of $g_i$.

Even with setting $\bar{g}$ as the allowable constraint limit there can be numerical overflow issues. Often, the initial control trajectory violates the constraints, thus causing a positive value in the exponent.

Consider a numerical analysis related to computing accuracy standards. Per IEEE 754 standard on single-precision floating-point, the exponent of a single-precision floating-point is an integer on [−126; 127]. For the largest exponent of 127, this represents $2^{127} \approx 10^{38}$. While $10^{38}$ is large, $10^{38} \approx e^{87.5}$ forms an upper bound on the stable values of the nested exponent. Thus, ρ must be scaled to avoid numerical overflow errors.

Evaluating in double-precision float-point does little to help. Per IEEE 754, the exponent of a double-precision floating point is an integer on [−102; 1024]. Thus, $2^{1024} \approx 10^{308} \approx e^{710}$, which allows a larger upper bound for the nested exponent, but only allows a single order of magnitude larger p over single-precision.

With these considerations of the KS aggregation in mind, the objective function and constraints are formed next.

Obstacle: x Distance at Fixed y Offset

In the minimum distance formulation, the objective function is posed as the x position when crossing the $y_{threshold}$ boundary. This is referred to as the x distance at fixed y offset. This formulation inherently guarantees satisfaction of the first criterion of a CIS maneuver.

Due to the discrete numerical integration used in the state trajectory prediction, no state $y_i$ will contain $y_i = y_{threshold}$. However, consider the two consecutive integration points bounding $y_{threshold}$, where $y_k < y_{threshold} < y_{k+1}$. The x position when passing the obstacle can be estimated by linear interpolation between the bounding states $x_k$ and $x_{k+1}$.

$$distance_{fixed\ offset}(x_k, x_{k+1}) = x_k + \frac{x_{k+1} - x_k}{y_{k+1} - y_k}(y_{threshold} - y_k) \quad (11)$$

Equation (11) solves for the x position when the y position crosses $y_{threshold}$. This is used as the objective function in the minimum distance formulation, as the minimum distance CIS maneuver is defined by the shortest x distance that a lane change can take place, subject to the additional safety constraints that are described later.

Obstacle: y Offset at Fixed x Distance

For the minimum slip formulation, the first CIS criterion is not guaranteed through the objective function and therefore must be enforced as a constraint. In the minimum slip formulation, obstacle x position, $x_{obstacle}$, is passed into the controller, which forms the numerical constraint (12) introduced below. This environmental information about the obstacle is not to relevant minimum distance formulation.

Similar to the minimum distance formulation, the y offset at fixed x distance is taken as a linear interpolation to take discrete numerical integration into account. Consider the two consecutive states bounding the obstacle position, where $x_j < x_{obstacle} < x_{j+1}$. The y position when passing the obstacle can be estimated by linear interpolation between $x_j$ and $x_{j+1}$. This forms the following numerical constraint, which is structured such that $offset_{fixed\ distance} \leq 0$ is defined as feasible.

$$offset_{fixed\ distance}(x_j, x_{j+1}) = y_{threshold} - \left(y_j + \frac{y_{j+1} - y_j}{x_{j+1} - x_j}(x_{obstacle} - x_j)\right) \quad (12)$$

Maximum Tire Slip

In the second optimization formulation developed in this work, minimizing the aggressiveness of a CIS maneuver is achieved by minimizing the maximum tire slip experienced at any point in the prediction horizon. The instantaneous tire slip angle is given by $$\alpha = \delta - \arctan\left(\frac{v + \omega l}{u}\right) \quad (13)$$

At each time integration point i in the prediction horizon, the instantaneous front and rear tire slip angles are calculated, denoted $\alpha_{f,i}$ and $\alpha_{r,i}$. These are aggregated into a constraint vector $\alpha^*$, where the [1, n] elements correspond to the front slip angles at the $i^{th}$ time step, and [n+1, 2n] elements correspond to the rear slip angles at the $(i-n)^{th}$ time step.

In the context of the objective function, choosing the proper $\bar{g}$, thus allowing a larger ρ, for the objective function is not obvious. If $\bar{g}$ is too large, all values in the exponent will be negative, leading to numerical underflow errors, which have the same loss of gradient issue as overflow errors. Setting g as half the peak allowable slip, $\alpha_{peak}$, has been numerically stable in testing for the chosen tire properties. This is a good design point, as it middles the likelihood of numerical overflow and underflow errors.

The KS function that aggregates the tire slip constraints is then given by $$KS(\alpha^*, \rho_{obj}, \alpha_{peak}) = \alpha_{peak} + \frac{1}{\rho_{obj}}\ln\left(\sum_{i=1}^{2n} e^{\rho_{obj}(|\alpha_i^*| - \alpha_{peak})}\right) \quad (14)$$

Note that (14) uses the absolute value in the exponent. This ensures the objective function is to minimize the largest magnitude of the slip angle, and not necessarily its largest value. While absolute value functions can cause discrete nonlinearities for optimization, the discrete switch is at zero slip, which is not in the neighborhood of the optimum.

Lane Constraint

Per the second CIS criterion, the vehicle trajectory must remain inside the outer lane boundary. Numerically, this is established by ensuring the following condition.

$$y(t_i) \leq y_{outer} \forall i \in [1, n] \quad (15)$$

For the example 2.5 s prediction horizon at 10 ms integration steps, there are a total of 251 points in the state trajectory. While all 251 states could be included as individual constraints, this grows the optimization problem, causing excess computational expense. Further, there are only a few states that are near the lane boundary. Thus, the KS function is again a good choice for constraint aggregation. The shifted lane boundary constraint is constructed as follows, where y is a vector containing $y_i$ at each integration point.

$$KS(y, \rho_{lane}, y_{outer}) = y_{boundary} + \frac{1}{\rho_{lane}} \ln\left(\sum_{i=1}^{n} e^{\rho_{lane}(y_i - y_{boundary})}\right) \quad (16)$$

Nonlinear Tire Constraint

The third CIS criterion of maintaining a stable trajectory throughout is enforced by constraining the tire slip angle to within the stable limits. Depending on the tire properties used in (6), the tire lateral force may relax above a peak slip angle. This is an unsafe driving condition, because the controller does not have any control authority to increase the tire force and stabilize the vehicle when this regime is reached [8].

For the parameters used in this model, the peak tire force occurs around 12° slip. Beyond this peak slip angle, the lateral force in the tire frame decays. Further, due to the coordinate transform of the lateral force into the vehicle frame through the steering angle, the maximum lateral force is not necessarily experienced at the same peak slip.

Figure 3:
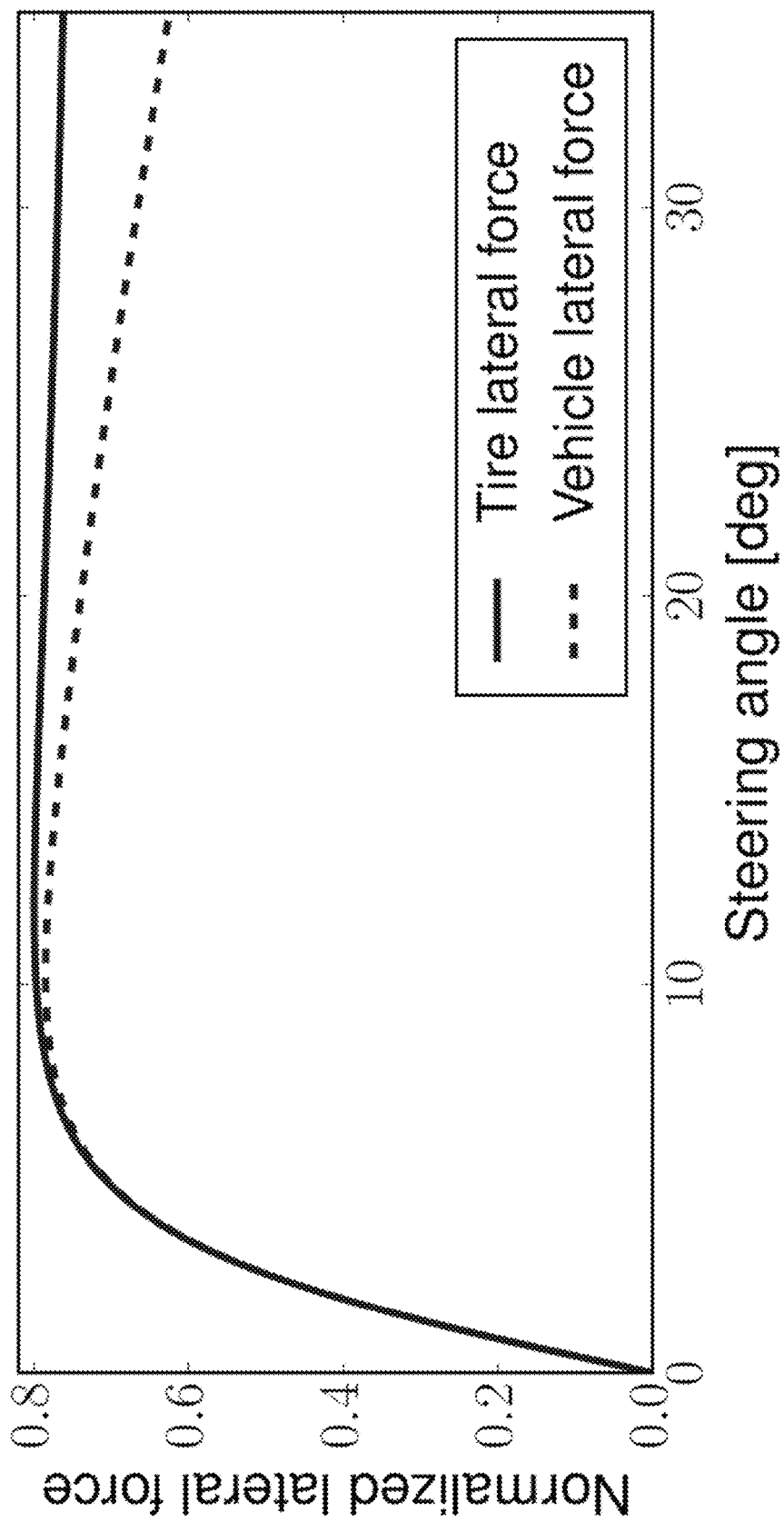
FIG. 3 shows lateral force in a tire frame and in a vehicle frame when a vehicle is traveling longitudinally.

Consider FIG. 3 showing the lateral force in the tire frame and in the vehicle frame when the vehicle is traveling longitudinally. When the vehicle has no lateral velocity or yaw rate, the steering angle and slip angle match exactly. The peak lateral force in the tire frame is at a steering angle of about 12°, but the peak lateral force in the vehicle frame is achieved at about 10°. At higher steering, the lateral force in the vehicle frame decreases faster than in the tire frame due to the coordinate transform.

The third CIS criterion of maintaining a stable trajectory throughout is enforced by constraining the tire slip angle to within the stable limits. Depending on the tire properties used in (6), the tire lateral force may relax beyond the peak slip angle. This is an unsafe driving condition, because the controller does not have any control authority to increase the tire force and stabilize the vehicle when this regime is reached [8].

For the parameters used in this model, the peak tire force occurs around 12° slip. Beyond this peak slip angle, the lateral force in the tire frame decays. Further, due to the coordinate transform of the lateral force into the vehicle frame through the steering angle, the maximum lateral force is not necessarily experienced at the same peak slip.

Figure 4:
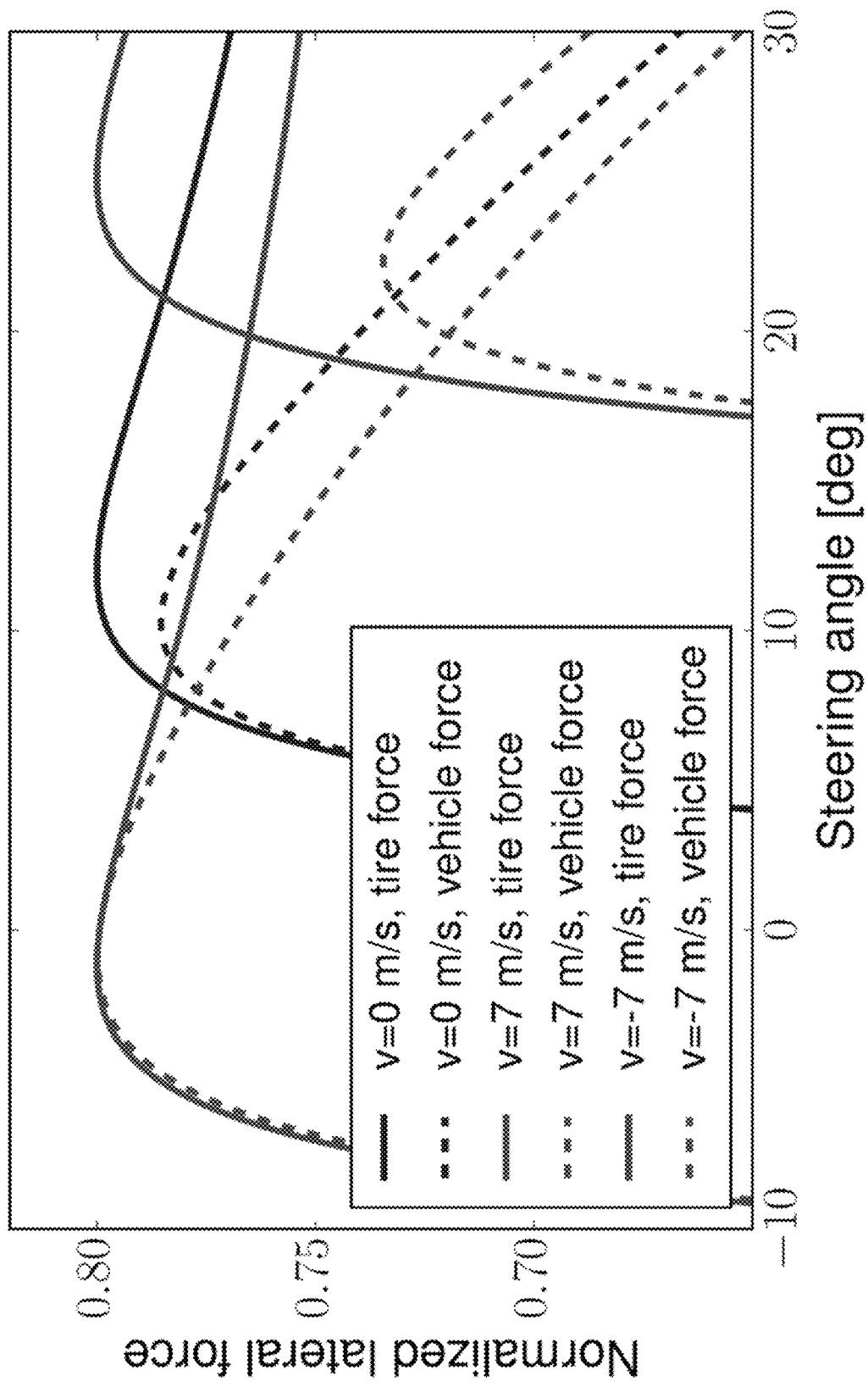
FIG. 4 shows lateral force in a tire frame and in a vehicle frame when a vehicle is traveling longitudinally with variations in lateral velocity.

FIG. 3 shows the lateral force in the tire frame and vehicle frame is plotted in solid blue and dashed blue, respectively. In this scenario, the vehicle is traveling straight ahead, thus the steering angle matches exactly the slip angle. Due to the coordinate transformation, at high steering angles the vehicle lateral force decays faster than the tire lateral force. FIG. 4 shows the same variables of FIG. 3, but for variations in lateral velocity. For this example, angular velocity is zero, but angular velocity introduces tire slip to the same effect lateral velocity does.

The fact the vehicle lateral force decays after reaching a peak also presents difficulty for gradient-based optimization. If a design point places the vehicle at high steering angles, i.e. beyond the peak lateral force in the vehicle frame, the gradient information to reduce the lateral force actually implies increasing the steering angle. This causes a local minimum, because, to the optimizer, the vehicle will travel straighter by increasing the steering angle.

The lateral force mismatch between the vehicle frame and tire frame is exacerbated when lateral velocity is introduced. Lateral velocity causes an initial tire slip angle that can be either constructive or destructive with the steering angle. FIG. 4 shows lateral forces for varying steering angles at different lateral velocities. The difference in steering angle for peak lateral force in the vehicle frame versus tire frame is not consistent for different lateral velocities, nor is the difference in magnitude of the peak lateral force in the vehicle frame versus tire frame consistent. Further, the neutral steering angle for zero lateral force is not at a fixed steering angle. Thus, applying constraints to the steering angle does not ensure vehicle stability.

Fundamentally, the stable steering region is where $$\frac{d|F_{y,veh\,frame}|}{\delta\sigma} > 0.$$

However, analysis of the numerical optimization problem describing the proposed CIS maneuver showed that using this criterion for the constraint, and subsequently calculating sensitivities of this constraint for gradient-based optimization, to be computationally expensive. As a conservative alternative, limiting the peak tire slip to $\alpha_{peak}=8°$ is found to keep the steering angle within the stable region. Subsequently, a trajectory is considered stable if the tire slip never exceeds $\alpha_{peak}$.

The choice of $\alpha_{peak}$ varies for the tire parameters chosen in the Pacejka tire formula, and must be evaluated numerically to establish good stability bounds. For the model used in this work, the front and rear tires have the same properties. However, in general, the front tire properties can be independent from the rear tires, thus having an effective $\alpha_{peak,\,front}$ and $\alpha_{peak,\,rear}$. This would correspond to two stability KS constraints, one for the front and one for the rear.

Additionally, splitting the tire slip constraints into two KS aggregations provides more information to the optimizer. In the context of the feasibility problem, where the optimizer is trying to find a candidate design point that satisfies the constraints, splitting the front and rear slip constraints makes an easier optimization problem, as the optimizer has gradient information pertaining to the front slip and rear slip independently. Hence, the following two KS functions are introduced.

$$KS(\alpha_{front}, \rho_{front}, \alpha_{front,peak}) = \quad (17)$$
$$\alpha_{front,peak} + \frac{1}{\rho_{front}} \ln\left(\sum_{i=1}^{n} e^{\rho_{front,peak}(|\alpha_i| - \alpha_{front,peak})}\right)$$

$$KS(\alpha_{rear}, \rho_{rear}, \alpha_{rear,peak}) = \quad (18)$$
$$\alpha_{rear,peak} + \frac{1}{\rho_{rear}} \ln\left(\sum_{i=1}^{n} e^{\rho_{rear}(|\alpha_i| - \alpha_{rear,peak})}\right)$$

In general, the tire slip constraint will not be active at the optimal solution in the minimum aggressive maneuver formulation, as the optimizer will seek to minimize the tire slip angle. However, depending on the numerics of the optimizer, some intermediate design points can be infeasible, which can lead to the stability concerns discussed previously. Therefore, these KS constraints are included in the minimum aggressive maneuver formulation, as well.

Stable Terminal State

Another aspect of the third CIS constraint is that the vehicle must stabilized in the next lane at the end of the prediction horizon. Here, stable in the next lane means that the vehicle is in the middle of the next lane, facing down the lane and traveling purely longitudinally. Constraining the final state in the prediction horizon at the long-term desired state ensures the controller's control trajectory and state trajectory sees the maneuver the whole way through. This prevents the controller from initializing a maneuver that is safe in the prediction horizon, but later places the vehicle in an unrecoverable state as the prediction horizon recedes through the maneuver. The desired final state is expressed as follows.

$$x_{final} = [x \ y_{lane} \ 0 \ u_0 \ 0 \ 0 \ 0 \ 0] \quad (19)$$

In (19), the final x position is defined recursively; per the CIS criteria, the terminal x position is not a consideration, thus has no influence.

The stable terminal state condition is then enforced through an equality constraint to drive the difference between the actual final state in the prediction horizon, $x_h$, and $x_{final}$, to zero.

Steering Rate and Steering Angles

In addition to the criteria for a successful CIS maneuver, there are physical limits imposed by the vehicle that need to be satisfied for a maneuver to be feasible. Specifically, the wheels are steering angle and steering rate limited.

In particular, the front tire limits are set as $|\delta_{front}| \leq 35°$ and $|\dot{\delta}_{front}| \leq 70$ deg/s. The steering angle limit is consistent with typical vehicle designs, whereas the chosen steering rate limit corresponds to turning the steering wheel full left or full right in about one second. Even though actuators may be capable of turning the steering wheel at a higher rate, a rate is preferred in this work that is commensurate with how fast a human driver can turn the wheel.

For systems with active rear steering, the rear wheels typically do not have as large of a range of motion as the front wheels. Hence, the rear steering angle and rate limits are set to $|\delta_{rear}| \leq 10°$ and $|\dot{\delta}_{rear}| \leq 35$ deg/s, respectively. This formulation also captures conventional front wheel only steering vehicles by setting $\delta_{rear} = 0°$ and $\dot{\delta}_{rear} = 0$ rad/s.

In terms of implementing these mechanical limits as constraints for numerical optimization, the steering angle and steering rate limits are handled differently from previous constraints. The front and rear steering rates are constraints on the magnitude of the control inputs, which are the design variables used in MPC. These constraints are best incorporated as bounds to the optimization. The steering angle limits could be modeled using the KS aggregation discussed before, but that would remove the underlying linearity of the steering angle to the design variables, which in turn may affect the performance of the numerical optimizer.

ρ Scaling

The parameter $\rho$ should be scaled as large as possible without causing numerical stability issues. The various KS constraints used so far aggregate values of varying magnitude, thus a universal $\rho$ for the optimization is not feasible.

From KS property (9c), the overshoot bounding equation can fix $\rho$ for a set allowable percent overshoot. This introduces an allowable overshoot parameter, $f_{overshoot}$, which is the ratio of how much overestimation though the KS aggregation is allowable to the maximum allowable constraint value.

$$f_{overshoot} := \frac{(KS(g, \rho) - \max(g_i))}{\bar{g}_{allowable}} \rho = \frac{\ln(n)}{f_{overshoot} \bar{g}_{allowable}} \quad (20)$$

For the maneuver considered in this work, $f_{overshoot} = 0.15$ has been sufficient to accurately aggregate the constraints, while avoiding numerical overflow issues. For the example time scale, n=251 vehicle states are used. This corresponds to $\rho_{lane} = 8.9$ and $\rho_{front} = \rho_{rear} = 264$. In the context of the objective function, there is no peak allowable objective value, but using $\rho_{obj} = 264$ has been numerically stable.

Optimization Problem Formulation

In numerical optimization, a candidate design point, corresponding to a control trajectory, is evaluated for the objective function and constraints. Based on the values of the objective function and constraints, as well as the sensitivities of the objective and constraints to the design variables, the design variables are updated to improve fitness and feasibility. Details on calculating the integration state sensitivities for nonlinear MPC can be found in [20].

By combining the objective function and constraints discussed previously, two optimization problems are formulated as follows. For both formulations, recall that (5) and (7) form a mapping from control trajectory to state trajectory, which is not explicitly part of the optimization.

(1) Minimum Distance Formulation: Consider first the minimum distance formulation. For this formulation, the first CIS criterion is built into the objective function, and second and third CIS criteria are incorporated as hard constraints. The safety constraints on the lane boundary and tire slip are included as KS aggregation functions, and steering angle and steering rate are expressed as linear constraints. The terminal constraints are included as individual equality constraints to ensure that the final state $x_h$ exactly matches $x_{stable}$. The resulting optimization formulation is expressed as follows.

$$\begin{aligned}
\min_{u} \quad & \text{distance}_{fixed \ offset}(x_k, x_{k+1}) \\
\text{subject to} \quad & KS(y, \rho_{lane}, y_{boundary}) \leq 0 \\
& KS(\alpha_{front}, \rho_{front}, \alpha_{front,peak}) \leq 0 \\
& KS(\alpha_{rear}, \rho_{rear}, \alpha_{rear,peak}) \leq 0 \\
& x(t_h)_i - (x_{final})_i = 0 \ \forall \ i \in [2, 8] \\
& |\delta_f(t_i)| \leq \delta_{front,max} \\
& |\delta_r(t_i)| \leq \delta_{rear,max} \\
& |\dot{\delta}_f(t_i)| \leq \dot{\delta}_{front,max} \\
& |\dot{\delta}_r(t_i)| \leq \dot{\delta}_{rear,max}
\end{aligned}$$

(2) Minimum Slip Formulation: For the minimum slip formulation, the three CIS criteria are all enforced as constraints, with the objective function minimizing the maximum front or rear tire slip experienced throughout the maneuver. Similar to the minimum distance formulation, the lane boundary and slip stability criteria are implemented as KS functions, terminal state as equality constraints, and steering angle and rate limits as linear constraints. The optimization problem is expressed mathematically as follows.

$$\begin{aligned} \min_{u} \quad & KS(\alpha^*, \rho_{obj}, \alpha_{peak}) \\ \text{subject to} \quad & \text{offset}_{\text{fixed distance}}(x_j, x_{j+1}) \leq 0 \\ & KS(y, \rho_{lane}, y_{boundary}) \leq 0 \\ & KS(\alpha_{front}, \rho_{front}, \alpha_{front,peak}) \leq 0 \\ & KS(\alpha_{rear}, \rho_{rear}, \alpha_{rear,peak}) \leq 0 \\ & x(t_h)_i - (x_{final})_i = 0 \,\forall\, i \in [2, 8] \\ & |\delta_f(t_i)| \leq \delta_{front,max} \\ & |\delta_r(t_i)| \leq \delta_{rear,max} \\ & |\dot{\delta}_f(t_i)| \leq \dot{\delta}_{front,max} \\ & |\dot{\delta}_r(t_i)| \leq \dot{\delta}_{rear,max} \end{aligned} \quad (22)$$

Numerical Results

The optimization problems (21) and (22) are transcribed into C for numerical optimization using IPOPT [21]. Optimal solutions are found in approximately 120 ms wall time using a high performance desktop computer. However, it is noted that certain devices such as a custom computational device utilizing one or more graphics processing units (GPUs) may have faster performance.

As a benchmark, consider first the limit braking distance. The limit braking is evaluated as the distance required to come to a complete stop, where the only deceleration considered is through the tire-road interaction. For the host vehicle braking at 30 m/s and decelerating at the peak tire force of 0.8 g, the vehicle travels 57.3 m over 3.8 s. Actual braking distance can be an improvement over this estimate. Automotive manufactures often publish 60 mph to 0 mph braking distance, and for the example vehicle considered here, the 60-0 mph test required 34.4 m, which corresponds to an average deceleration of about 1.2 g. In actual testing, aerodynamic drag and down force can be significant, hence the improved performance. For comparison, 1.2 g deceleration from 30 m/s requires 44.6 m to stop.

Minimum Distance Performance

Consider first the minimum distance formulation of (21). FIGS. 5A-5D details the lane change procedure and various vehicle states throughout the maneuver. Specifically, FIG. 5A-5D shows four concurrent plots, plotted against x position of the maneuver, and the various states and control inputs during the aggressive lane change.

Figure 5A:
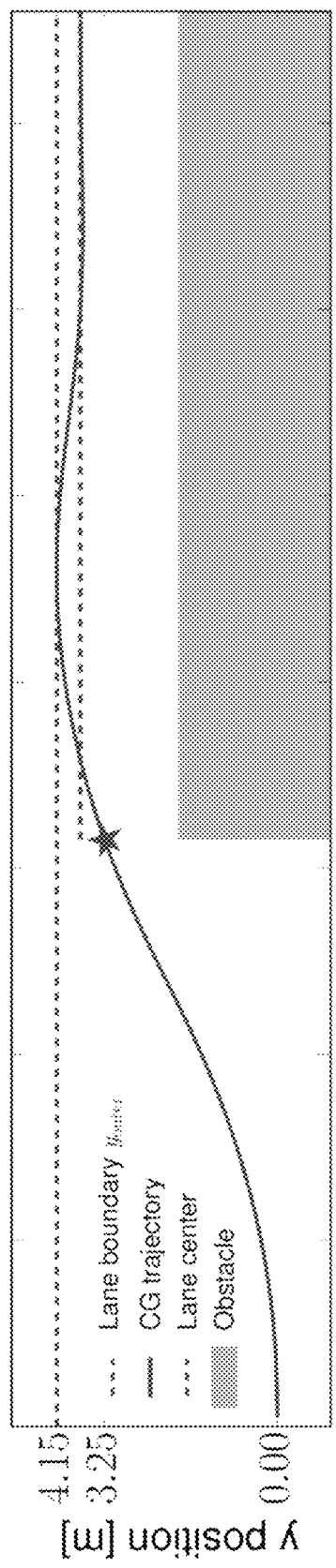
FIG. 5A shows the x-y trajectory in blue as the vehicle travels down a highway performing a maneuver.

FIG. 5A shows the x-y trajectory in blue as the vehicle travels down the highway. For front and rear steering limited to $\alpha_{peak}=8°$, the vehicle changes lanes in 31.0 m, which is almost half the distance of theoretical limit braking at 0.8 g, and about a two thirds of the one at 1.2 g. The orange rectangle represents a fully blocked lane and is placed at an x position to represent when the host vehicle departs the lane. The blue star represents $y_{threshold}$.

Figure 5B:
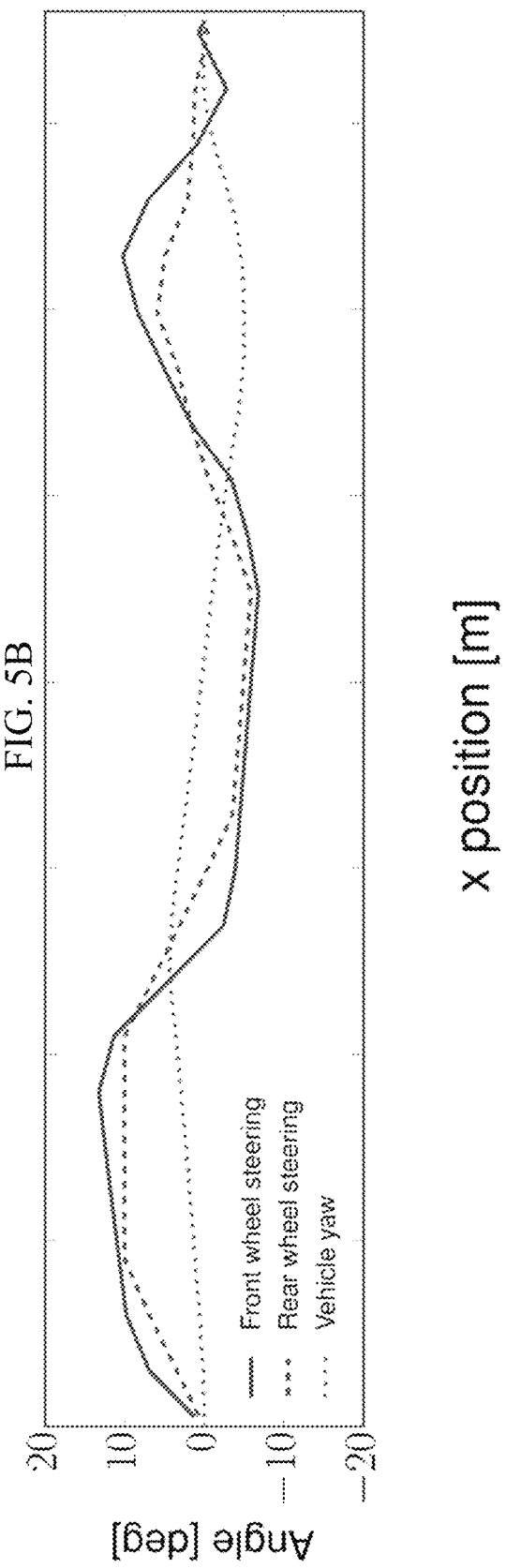
FIG. 5B shows the front and rear steering angle, as well as vehicle rotation during the maneuver of FIG. 5A.

FIG. 5B shows the front and rear steering angle, as well as vehicle rotation. Both front and rear wheels initialize the turn to the left to begin departing the lane, then both turn to the right to stay within the lane boundary, and finally steer to stabilize the vehicle at the end of the trajectory. An interesting characteristic of the CIS maneuver is that the vehicle begins to turn to the right even before clearing the obstacle. This is because if the vehicle held the left turn until leaving the lane, the vehicle would not be able to stay within the lane boundary later in the trajectory. Turning back into the lane prior to clearing the obstacle is likely in contrast to what a panicked, non-professional human driver would do.

Figure 5C:
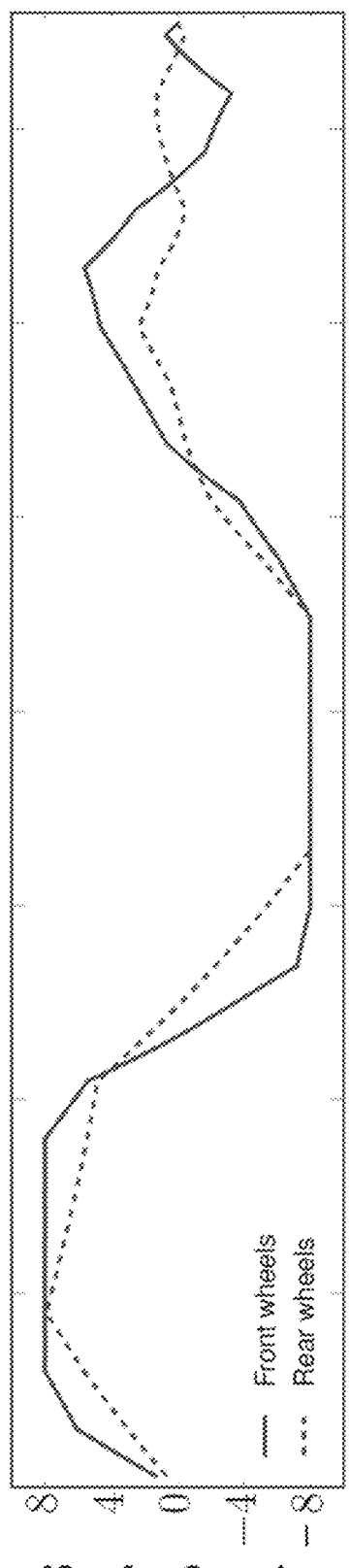
FIG. 5C shows the tire slip throughout the maneuver of FIG. 5A.

FIG. 5C shows the tire slip throughout the maneuver. The front tires turn left to their peak slip limit to maximize the lateral force in the vehicle frame, and hold the high slip angle until turning to the right and holding the peak slip again. While holding the high slip, the front wheels make small steering adjustments to maintain the high slip as vehicle lateral velocity and yaw rate develop.

The rear tires attempt to turn to their peak slip limit, as well, but are steering angle and rate limited in doing so. As a result, they reach the peak steering angle, before turning back to the right at the peak steering angle again. Because the rear steering mechanism's steering and steering rate constraints are active, it is feasible that an improved rear steering mechanism can improve the CIS performance.

Figure 5D:
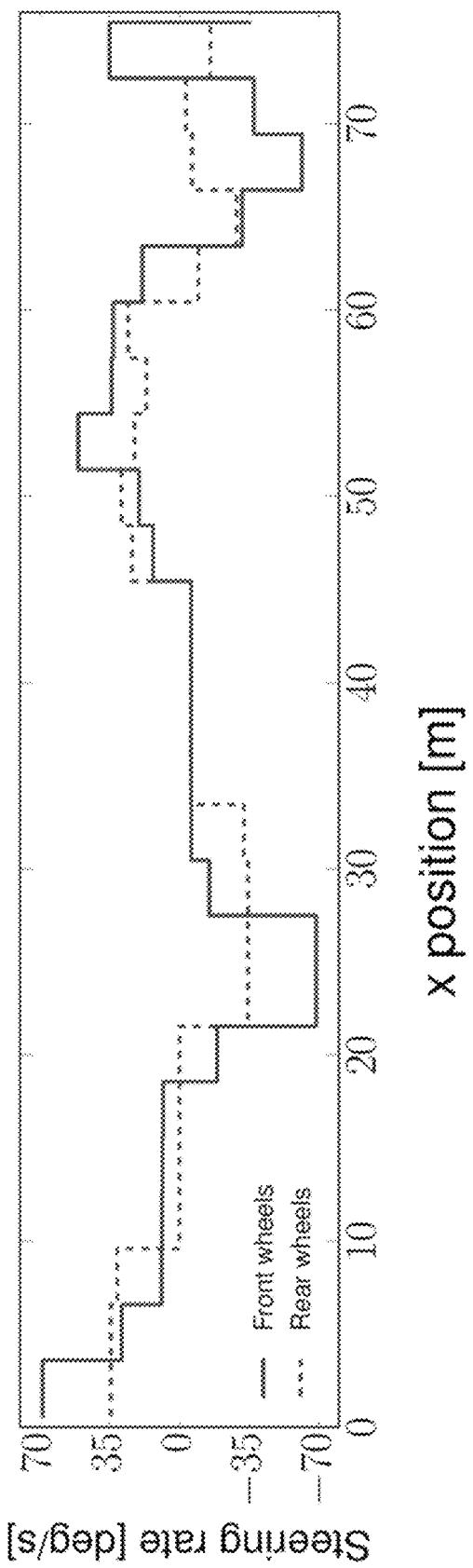
FIG. 5D shows the steering rate throughout the maneuver of FIG. 5A.

FIG. 5D shows the steering rate throughout the maneuver. The piece-wise constant control trajectory is clear through the discrete steps, as a new steering rate can only be issued every $t_c=100$ ms, representing about 3 m of x displacement.

Figure 6:
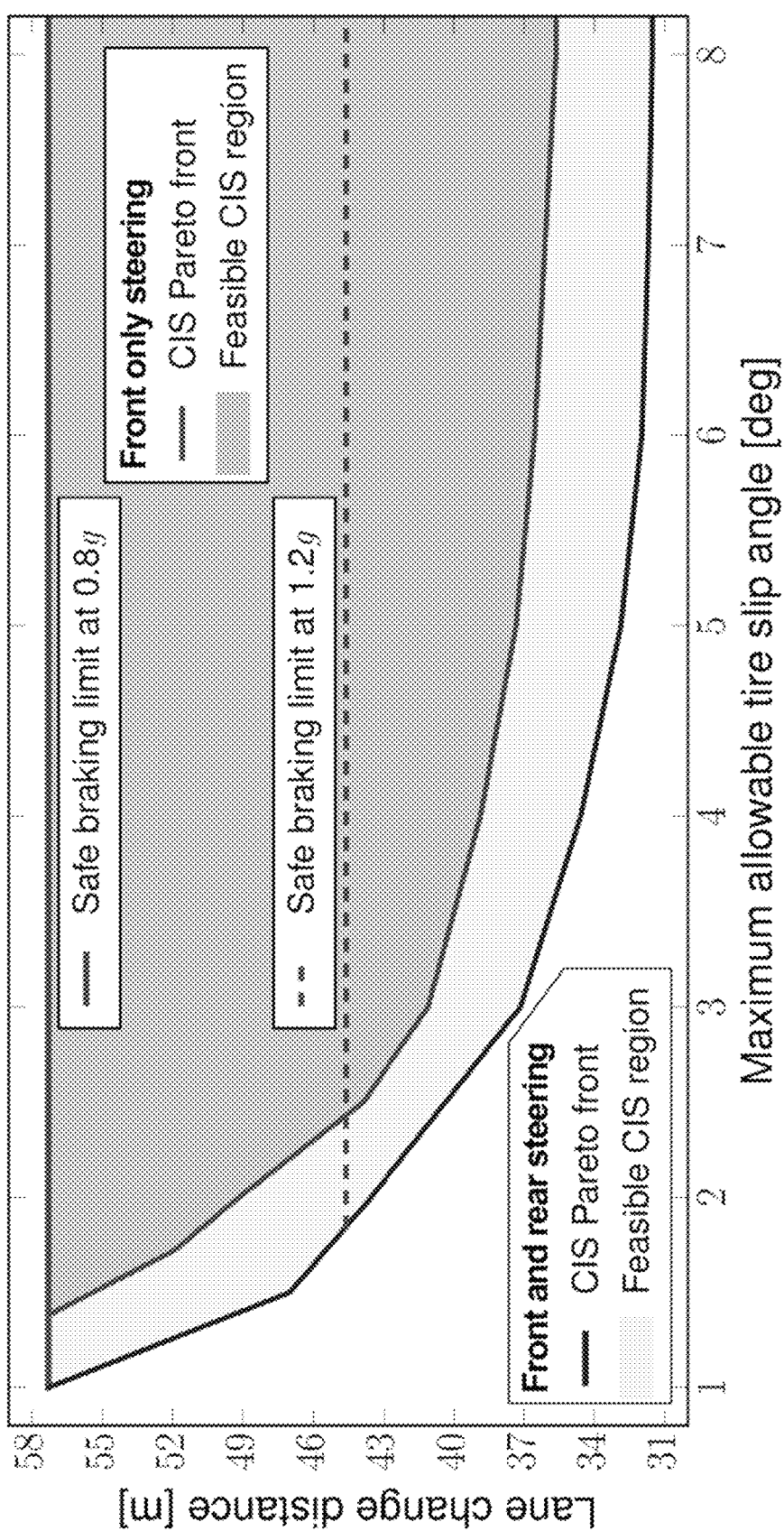
FIG. 6 shows a graph of the minimum lane change distance against peak allowable slip for both front and rear steering, and front only steering architectures.

FIGS. 5A-5D were obtained using the peak slip angle. By varying the allowable maximum slip angle $\alpha_{peak}$ in (21), the trade-off between CIS aggressiveness and minimum distance can be explored. FIG. 6 shows the minimum lane change distance against peak allowable slip for both front and rear steering, and front only steering architectures. Front only steering is numerically achieved by locking rear wheel deflection $\delta_{rear}$ to 0°.

Based on the Pareto fronts of FIG. 6, the windows of opportunity to initiate a CIS maneuver are sizable, even for low slip angles. Only at very low slip angles, i.e. less than 2° peak slip, do the theoretical limit braking distances match the required CIS distance.

If the vehicle finds itself beyond the safe braking limit for any reason, it is feasible that a CIS maneuver can still be performed to avoid collision. While the minimum distance CIS formulation provides a theoretical bound on the shortest lane change distance, waiting until this theoretical limit distance to initiate CIS is not an advisable control strategy in practice due to plant-prediction model mismatch inherent to MPC [22].

Thus, the minimum slip formulation is considered next, which solves the CIS maneuver of taking action immediately to clear the obstacle and minimizing the peak slip of the trajectory.

FIG. 6 shows lane change distance at a given maximum allowable tire slip angle. Increasing the allowable slip angle improves the effectiveness of the CIS system, but with diminishing returns.

FIGS. 7A-7D show an obstacle that is set at an x position of 57 m, representing the theoretical limit braking distance at 0.8 g. At 5 m increments, the minimum slip trajectory is solved, and x-y CG trajectory plotted.

Minimum Slip Performance

In the minimum slip formulation, the optimization problem is structured to change lanes by a fixed x displacement. FIGS. 7A-7D show the effect of shorter lane change distance requirement on the x-y CG trajectory. For each solved trajectory, the vehicle could theoretically initiate the CIS maneuver, but instead the vehicle keeps traveling straight ahead to show how subsequent trajectories evolve.

Figure 7A:
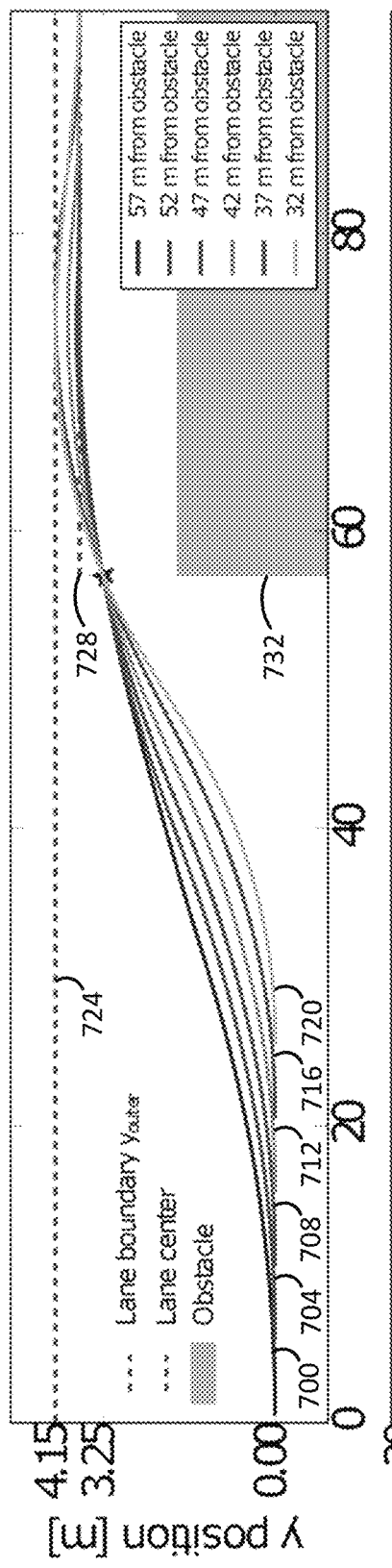
FIG. 7A shows the x-y trajectory of various maneuvers at various distances from an obstacle.

In FIGS. 7A-7D, all of the trajectories obey the numerical optimization problem in (22), and hence all the criteria of the CIS maneuver. However, earlier initiated state trajectories differ from later initiated state trajectories in that the constraints are not all necessarily active. FIG. 7A shows the x-y trajectory of various maneuvers at distances of 57 m from the obstacle (marked by 700), 52 m from the obstacle (marked by 704), 47 m from the obstacle (marked by 708), 42 m from the obstacle (marked by 712), 37 m from the obstacle (marked by 716), the 32 m from the obstacle (marked by 720). The outer lane boundary $y_{outer}$ is marked by 724, the lane center is marked by 728, and the obstacle is marked by 732.

Figure 7B:
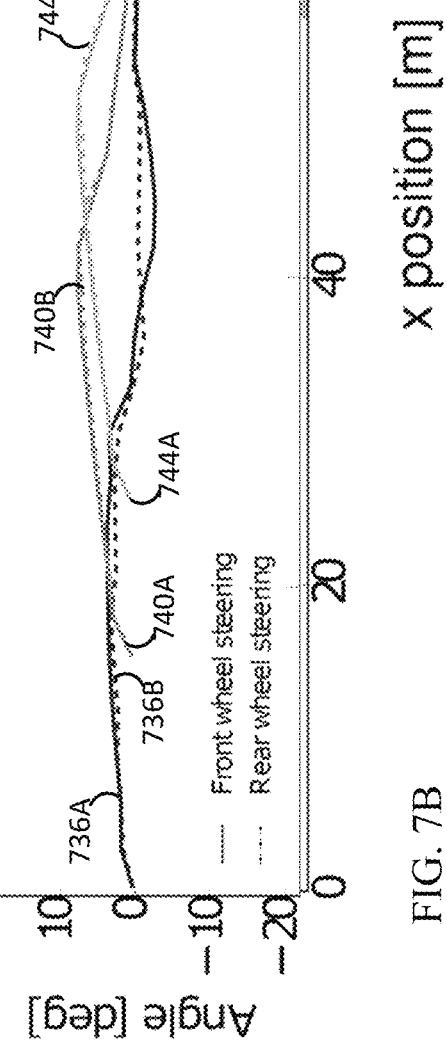
FIG. 7B shows the front and rear steering angles of various maneuvers at various distances from the obstacle of FIG. 7A.

FIG. 7B shows the front and rear steering angles for maneuvers starting at 57 m, 42 m, and 32 m from the obstacle. Front wheel steering angles and rear wheel steering angles for the maneuver at 57 m are marked by 736A and 736B respectively. Front wheel steering angles and rear wheel steering angles for the maneuver at 42 m are marked by 740A and 740B respectively. Front wheel steering angles and rear wheel steering angles for the maneuver at 32 m are marked by 744A and 744B respectively.

FIG. 7C shows the front and rear slip angles for maneuvers starting at 57 m, 42 m, and 32 m from the obstacle. Front wheel slip angles and rear wheel slip angles for the maneuver at 57 m are marked by 748A and 748B respectively. Front wheel slip angles and rear wheel slip angles for the maneuver at 42 m are marked by 752A and 752B respectively. Front wheel slip angles and rear wheel slip angles for the maneuver at 32 m are marked by 756A and 756B respectively.

FIG. 7D shows the front and rear steering rates for maneuvers starting at 57 m, 42 m, and 32 m from the obstacle. Front wheel steering and rear wheel steering rates for the maneuver at 57 m are marked by 760A and 760B respectively. Front wheel steering and rear wheel steering rates for the maneuver at 42 m are marked by 764A and 764B respectively. Front wheel steering and rear wheel steering rates for the maneuver at 32 m are marked by 768A and 768B respectively.

Specifically, the optimizer does not push the trajectory to the outer lane boundary in the earlier initiated trajectories. As the vehicle closes in on the obstacle, the trajectories must change lanes more aggressively, causing some overshoot relative to the stabilized lane position. However, the optimizer does not push the vehicle all the way to the lane boundary if not needed.

As the vehicle is approaching the theoretical lower bounds on the distance-to-obstacle to initiate CIS, the outer lane boundary constraint becomes active. For trajectories initiated shortly before the theoretical lower bound, the minimum peak slip angle is governed by accelerating the vehicle in positive y to clear the obstacle, then accelerating in negative y to avoid exceeding the lane boundary.

Consider next the specific maneuvers for 57, 42, and 32 m solutions shown in FIGS. 7B-7D. In all trajectories, the vehicle begins the CIS maneuver with a turn to the left, placing the wheels at that solution's peak slip angle. The maneuvers then hold this left turn until beginning the counter steer to the right, at which point the wheels turn to the negative slip limit. Once the obstacle is cleared, all the solutions stabilize at the target state.

In general, the progressive solutions follow the same CIS strategy of loading the tires to turn to the left, then counter steering before crossing the obstacle. What differs between each trajectory is how aggressive the tire loading is, and for how long each segment is held. In order to change lanes quicker, the tires are loaded faster and higher, hence a more aggressive maneuver.

As the vehicle exceeds the theoretical bound on the distance-to-obstacle to initiate CIS, the optimizer is not able to find a feasible solution that satisfies the hard constraints as expected. In the context of gradient-based optimization, this means multiple successive design points that do not improve the constraints, which results in multiple failed iterations. This can be a difficult distinction in practice: for nonlinear optimization, it is impossible to distinguish difficult to solve problems from unsolvable problems based on computation time alone.

In this Section A., a one-level nonlinear MPC architecture is developed to solve for an aggressive lane change in a highway driving environment as a safety feature referred to as CIS. The presented formulation incorporates safety criteria as hard constraints; ensuring feasible solutions obey all defined safety criteria for a successful lane change. Two non-limiting example formulations are presented: a minimum distance formulation to show the theoretical shortest distance in which a lane change can be performed safely, and a minimum slip formulation to find the most gentle lane change for a given distance and to intentionally avoid pushing the vehicle to its dynamic limits of handling, unless necessary for safety.

For the minimum distance formulation, numerical simulations show an aggressive lane change can take place in approximately half the distance limit braking at 0.8 g requires when the vehicle is able to exploit the full range of tire traction and use advanced steering architectures such as active rear steering. Even in conventional front wheel only steering, the theoretical shortest lane change distance is significantly less than the one for limit braking. Furthermore, by analyzing the shortest distance as a function of the maximum allowable tire slip, Pareto fronts are generated for both front and rear steering and front only steering cases. This analysis shows that increasing the maximum allowable tire slip has diminishing returns, and at distances near the limit braking threshold, lane change maneuvers can take place at low slip angles, which are comparatively nonaggressive.

The minimum slip formulation aims to perform the CIS maneuver for a given distance and seeks to minimize the peak tire slip throughout the maneuver. As mentioned above, the resulting trajectory intentionally avoids pushing the vehicle to its dynamic limits of handling, unless necessary for safety.

One additional benefit of the minimum slip formulation is its robustness to plant-prediction model mismatch. The simulations presented here have been single open-loop design points; for closed-loop implementation, subsequent mid-maneuver updates will have additional tire loading available, if needed, to make trajectory corrections.

Section B. below expands the context to curved roads, which can address inside versus outside lane change. The formulation of Section A. is suitable for straight roads, as the lane boundary and obstacle information is well posed in the global Cartesian coordinate frame.

B. Minimum Slip Collision Imminent Steering in Curved Roads Using Nonlinear Model Predictive Control An approach to extend the minimum slip formulation as described in Section A. above to certain environments including curved roads is described in this Section B.

Automotive active safety features are designed to automatically augment or even override drivers in the event of unsafe driving situations. As next generation automobiles incorporate advanced hardware and improved computing platforms, new active safety features can be incorporated.

Collision imminent steering (CIS) is one such feature that is designed to actively perform a lane change in the event a forward collision cannot be avoided by breaking alone. As such, this is a safety critical maneuver that may push the vehicle to its dynamic limits of handling, but must not exceed them. Therefore, the primary control challenge with enacting a CIS maneuver is to determine the optimal control trajectory, and corresponding state trajectory. These trajectories are situation dependent and therefore not known a priori.

To address this challenge, previous research has developed a one-level nonlinear model predictive control (MPC) formulation for straight roads to ensure the state trajectory is feasible by the nonlinear vehicle dynamics and obeys hard safety considerations through numerical optimization constraints [23]. This disclosure extends this formulation to handle more general environments such as curved roads, as well.

CIS, as well as the larger problem of obstacle avoidance, has been studied at various levels of environmental complexity. To incorporate hard safety constraints, two-level linear [24] and two-level nonlinear [25] MPC controllers have enforced lateral displacement limits as numerical constraints in the optimization formulation. In these works, the MPC controller aims to track a reference trajectory by a PID fitness metric, but also monitors the lateral displacement in the prediction trajectory. If the lateral displacement from the reference trajectory is exceeded, the controller adjusts the trajectory to maintain displacement bounds, and then incorporates the objective function as a secondary factor. Although the controller is able to maintain hard safety constraints while regulating deviation from the reference trajectory, there are two key drawbacks. First, the controller is reliant on a reference trajectory to begin with, which, in general, is not known a priori. Second, the lateral displacement bounds must be explicitly defined at each time step to build the optimization problem, and thus relies on an additional layer to map the drivable space to deviation limits.

To address the first limitation, one-level MPC architectures have been developed, which handle the optimal path planning and path tracking simultaneously. Specific to a lane change maneuver, one-level linear MPC has been applied to a double lane change to study blended control [26]. In said work, two adjacent lanes are modeled and the vehicle is allowed to change lanes as it sees fit. Hard safety constraints are implemented by designing lateral displacement bounds to force a lane change prior to encountering an obstacle in the current lane, and then to return to the original lane after clearing the obstacle. While the controller is able to avoid collision, the formulation is based on linearized dynamics and the lane change procedure is described by an explicit bound on the y lateral displacement, which can only model straight road implementations [23].

In the context of the second limitation, the reviewed methods are not able to directly map environmental information into the optimization problem. Instead, the environmental information is mapped from its native x-y state space representation to time discrete space correlating with the predicted state trajectory. This multistage process can be challenging for three reasons. First, the time discrete environmental representation can change from one time step to the next in closed-loop control [25]. This discrete change can cause issues for gradient-based optimization, creating a more computationally expensive problem. Second, as the trajectory morphs during the MPC optimization, the environmental information relevant to each time step can change discretely, leading to the same gradient issues. Third, the additional mapping of state information and obstacle information to discrete time space to compute allowable lateral displacement bounds creates computational overhead compared to directly handling obstacle information in pure x-y state space.

Figure 8:
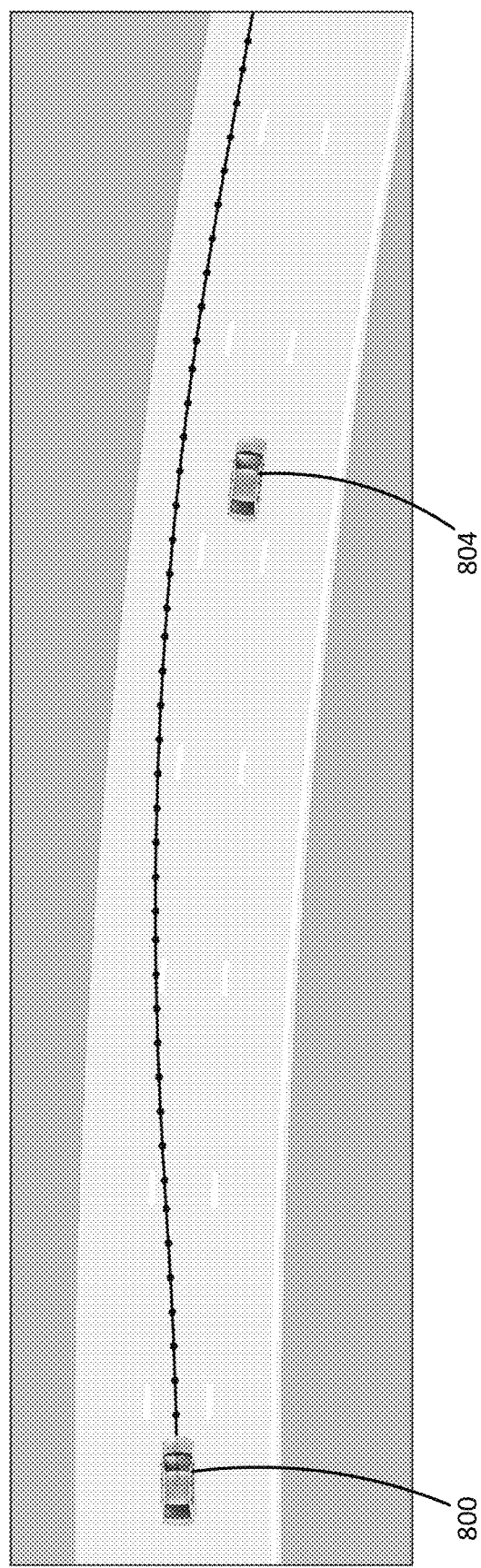
FIG. 8 shows an outside lane change as a candidate collision imminent steering maneuver.

In comparison to the state of the art, the salient contribution of the CIS controller presented in this disclosure is incorporating abstract driving environment information, as described by a drivable tube, directly into the feasibility definition of the CIS maneuver. By incorporating environmental information through x-y state space, the MPC optimization problem does not require lateral displacement bounds to be explicitly defined at each time step, nor does it rely on a reference trajectory to begin with. This allows the CIS formulation to be extended to include curved roads, increasing the environmental complexity the CIS controller can operate in, FIG. 8 shows a host vehicle 800, yellow, encountering an obstacle 804, blue. A candidate trajectory is drawn in teal, where the host has completely changed lanes when crossing the obstacle, remains within the road boundary throughout, and is centered in the new lane at the end of the maneuver.

The remainder of the Section B. disclosure is structured as follows. First, details on the curved highway environment and drivable space, as well as host vehicle and corresponding vehicle dynamics are contained below. Second, optimal control formulation including objective function and safety constraints are derived below. Numerical simulation results and their interpretations are then reported below Drivable Space and Vehicle Dynamics Model A highway driving environment is the most likely scenario of a CIS maneuver due to the high driving speed. For the proposed scenario, hard safety constraints are enforced by ensuring the vehicle remains within the lane boundaries, which is captured by the drivable tube [27].

The drivable tube can be generated from online evaluation of the current environment through the use of cameras, LIDAR, high definition GPS maps, and other sensor information. For the purposes of the numerical analysis, a drivable tube is generated geometrically from a simulated highway environment. The following derivation of the geometric drivable tube is included only to generate an input to the CIS controller; actual implementation would require online generation using information received from sensors coupled to the vehicle.

FIG. 8 shows an outside lane change as a candidate CIS maneuver. The host vehicle starts centered in the right lane and identifies a stationary obstacle. A candidate trajectory is overlaid, which shows the host vehicle changing lanes before crossing the obstacle, remaining inside the outer lane boundary, and then stable at the end of the maneuver.

To explore a highly challenging scenario, the highway curvature is chosen to push the vehicle to its upper limits of performance. A target highway speed of $u_0=35$ m/s (78 mph) is chosen, as it is on the faster side of acceptable highway speeds in the United States. Other speeds such as speeds from about 45 MPH to about 85 MPH may be used. For the chosen target speed, US highway building regulations dictate the minimum turn radius as about 1,500 m [28], but, to test a more aggressive maneuver and make the impact of curvature more prominent, a turn radius of $r_{turn}=500$ m is chosen.

Figure 9:
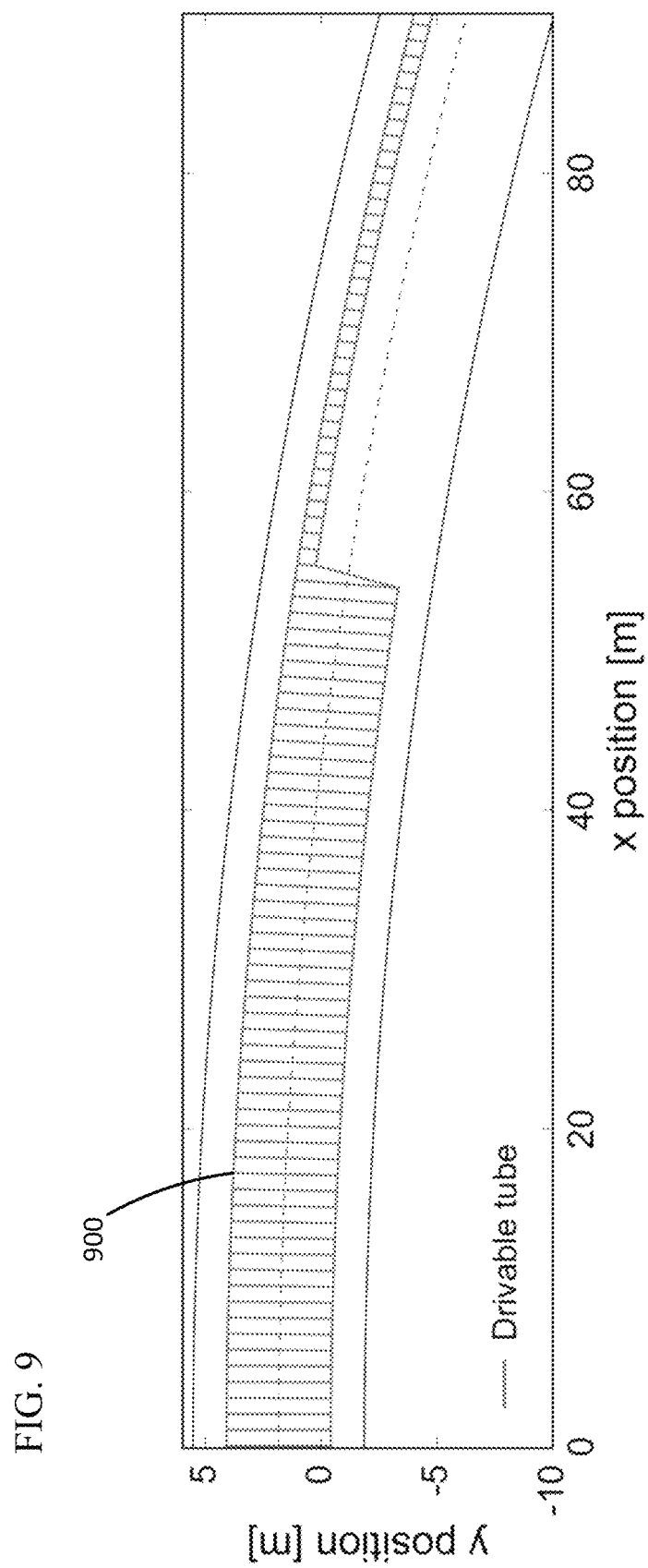
FIG. 9 shows a drivable tube for a lane change as well as approximate lane markings.

FIG. 9 shows a drivable tube 900 for the lane change in teal, as well as the approximate lane markings. The drivable tube shrinks as it passes the obstacle, and is contracted narrower than the lane width to account for the vehicle half width.

Additionally, the minimum highway lane width is defined as $w_{lane}=3.7$ m [29]. An obstacle is set stationary at a distance $d_{obstacle}=55$ m along the arc of the center of the middle lane. The distance of 55 m is chosen, as it is inside the safe braking distance, but is still far enough to perform a lane change safely [23]. In practice, obstacle information would be available from online sensors and incorporated into the drivable tube.

The hard safety constraint of keeping the vehicle inside the drivable space relies on a sequence of connected quadrangles, and is derived later. The drivable space is the topographical area of the lanes the vehicle can safely occupy, and a set of successive quadrangles within the drivable space forms the drivable tube.

For this maneuver, the drivable space is both left and right lanes until reaching the obstacle, then only the left lane thereafter. However, the prediction vehicle model, a 3 degrees of freedom (DoF) bicycle model described later in this section, only considers the vehicle's center of gravity (CG). As such, modifications to the drivable space must be made to account for the width of the vehicle. For a given vehicle width, $w_v$, and safety margin to account for vehicle rotation, $\sigma=0.5$ m, the drivable boundaries are squeezed to the center of the lane. This implies that before crossing $d_{obstacle}$, the right boundary follows a curvature of $$r_{turn} - \frac{w_{lane}}{2} + w_v + \sigma,$$

and the left boundary follows a curvature of $$r_{turn} + \frac{3 w_{lane}}{2} - w_v - \sigma.$$

After passing the obstacle, the drivable space is completely restricted to the left lane, thus the right edge boundary is $$r_{turn} + \frac{w_{lane}}{2} + w_v + \sigma,$$

and the left boundary remains the same.

Consider a global coordinate frame with the vehicle centered at the origin. The lanes are described by arcs centered at $(x_c, y_c)=(0, -r_{turn})$. The right and left edges of the drivable tube are calculated by taking discrete arc steps and storing the x and y position of the edge in a right and left boundary array. The four points corresponding to the two pairs at a given array index k and next step k+1 form one quadrangle.

Using this methodology, FIG. 9 shows the drivable tube for the right and left lane changes. Note, to avoid a quadrangle of zero length, a transition quadrangle is used immediately before the obstacle.

Consider next the details of the prediction model dynamics. The prediction model mirrors previous work [23], which provides an in depth derivation. The prediction model is a 3DoF bicycle model with active four wheel steering and Pacejka magic tire forces. The use of a simplified 3DoF bicycle model is based on previous studies that have shown this is sufficiently accurate for MPC-based obstacle avoidance when obstacles are not excessively wide [30]. Four wheel steering controllers extend to front-only steering system by locking the rear wheels.

Table III shows upper table is values from a manufacturer's technical specification. Table IV includes values derived as needed for 3DoF model.

The host vehicle is modeled after a luxury sedan, as this class of vehicles is the most common to introduce advanced hardware and software features. Parameters relevant to the 3DoF model are given in Table III, and Pacejka tire parameters in Table IV below.

TABLE III

| Vehicle Parameter | Parameter Symbol | Value |
|---|---|---|
| Vehicle mass | m | 1982 kg |
| Weight Distribution | — | 51.4/48.6 F/R |
| Wheel Base | — | 3.2 m |
| Vehicle Width | $w_v$ | 1.9 m |
| Front Wheel to CG distance | $l_f$ | 1.56 m |
| Rear Wheel to CG distance | $l_r$ | −1.64 m |
| Front wheel vertical force | $F_{z,f}$ | 1016 |
| Rear wheel vertical force | $F_{z,r}$ | 966 |
| Yaw moment of inertia | $I_{zz}$ | 4892 kg m$^2$ |

The vehicle states, control inputs, corresponding system dynamics, and nonlinear tire forces are given in (23)-(26).

$$x = \begin{bmatrix} \text{global } x \text{ position } [m] \\ \text{global } y \text{ position } [m] \\ \text{vehicle yaw [rad]} \\ \text{longitudinal velocity } \left[\frac{m}{s}\right] \\ \text{lateral velocity } \left[\frac{m}{s}\right] \\ \text{yaw rate } \left[\frac{\text{rad}}{s}\right] \\ \text{front steering angle [rad]} \\ \text{rear steering angle [rad]} \end{bmatrix} = \begin{bmatrix} x \\ y \\ \psi \\ u \\ v \\ \omega \\ \delta_f \\ \delta_r \end{bmatrix} \quad (23)$$

$$u = \begin{bmatrix} \text{front steering rate } \left[\frac{\text{rad}}{s}\right] \\ \text{rear steering rate } \left[\frac{\text{rad}}{s}\right] \end{bmatrix} = \begin{bmatrix} \dot{\delta}_f \\ \dot{\delta}_r \end{bmatrix} \quad (24)$$

$$\frac{dx}{dt} = \begin{bmatrix} u\cos(\psi) - v\sin(\psi) \\ u\sin(\psi) + v\cos(\psi) \\ \omega \\ 0 \\ -u\omega + \frac{(F_{y,f}\cos(\delta_f) + F_{y,r}\cos(\delta_r))}{m} \\ \frac{(F_{y,f}\cos(\delta_f)l_f - F_{y,r}\cos(\delta_r)l_r)}{I_{zz}} \\ \dot{\delta}_f \\ \dot{\delta}_r \end{bmatrix} \quad (25)$$

$$F_{y,-} = \mu F_{z,-} \sigma_{y,-} \quad (26)$$

$$\sigma_{y,-} = -\sin\left(C\arctan\left(\frac{BV_{y,-}}{V_{x,-}}\right)\right)$$

$$V_{x,-} = u\cos(\delta_-) + (v + \omega l_-)\sin(\delta_-)$$

$$V_{y,-} = -u\sin(\delta_-) + (v + \omega l_-)\cos(\delta_-)$$

In (25), u=0, implying the longitudinal velocity is locked. Fixing the longitudinal velocity is consistent with collision avoidance maneuvers, as explicit accelerations and braking are not permitted by the testing standard [31]. Later numerical results show the longitudinal acceleration due to the tire forces to be small, thus no significant loss of accuracy is incurred with fixing the longitudinal velocity.

Equations (23)-(26) fully dictate the prediction model used in the MPC formulation. In the next section, the MPC controller is formulated and underlying numerical optimization problem developed.

Optimal Control Problem and Model Predictive Control Formulation

The MPC controller uses an explicit fourth order Runge-Kutta (RK4) integration scheme to map the control trajectory to the predicted state trajectory. RK4 integration only provides the system states at each discrete time step, thus the minimum aggressive CIS maneuver criteria are developed to handle the sequence of integration states. At each time interval, the control input consists of a constant front and rear steering rate lasting $t_s$=100 ms. The prediction horizon extends to $t_h$=3 s, implying the control trajectory is 30 constant control inputs. The RK4 integration uses time steps of $\Delta t$=10 ms.

The system dynamics are propagated forward over the control trajectory, resulting in a state trajectory containing the full system state at each time step. This mapping through the RK4 integration inherently enforces the system dynamics constraints typically required in MPC; thus the system dynamics constraints do not need to be explicitly defined in the numerical optimization problem. However, RK4 integration still relies on an initial starting state to propagate the dynamics forward from, which is derived in the following subsection.

Initial State

The host vehicle is assumed to be traveling along a stable trajectory in the initial lane when the CIS maneuver is initiated. The initial states are found by evaluating (25) for $$\frac{dv}{dt} = \frac{d\omega}{dt} = 0$$

for a given $r_{lane}$, u, and desired $\delta_f$ and $\delta_r$ pair. In this example, the initial stable states are used as inputs to the controller, as the methodology can incorporate instantaneous states from sensor information at implementation.

The details of establishing the initial yaw rate, $\omega_0$, initial lateral velocity, $v_0$, rear steering angle, $\delta_r$, and corresponding front steering angle, $\delta_f$, are omitted for brevity. The initial x, y, and $\psi$ are all set to 0 as the controller is structured in a vehicle fixed coordinate frame. The nominal states form the following initial state vector, from which the RK4 integration propagates.

$$x(t_0)=[0\ 0\ 0\ u_0\ v_0\ \omega_0\ \delta_{f,0}\ \delta_{r,0}]^T \tag{27}$$

Drivable Space Constraint

The drivable space, and corresponding drivable tube, forms a left and right nonintersecting boundary for the vehicle CG.

TABLE IV

| Tire Parameter | Parameter Symbol | Value |
| --- | --- | --- |
| Coefficient of Friction | μ | 0.8 |
| Tire Property | B | 13 |
| Tire Property | C | 1.285 |
| Tire Longitudinal Velocity | $V_x$ | |
| Tire Lateral Velocity | $V_y$ | |

Figure 10:
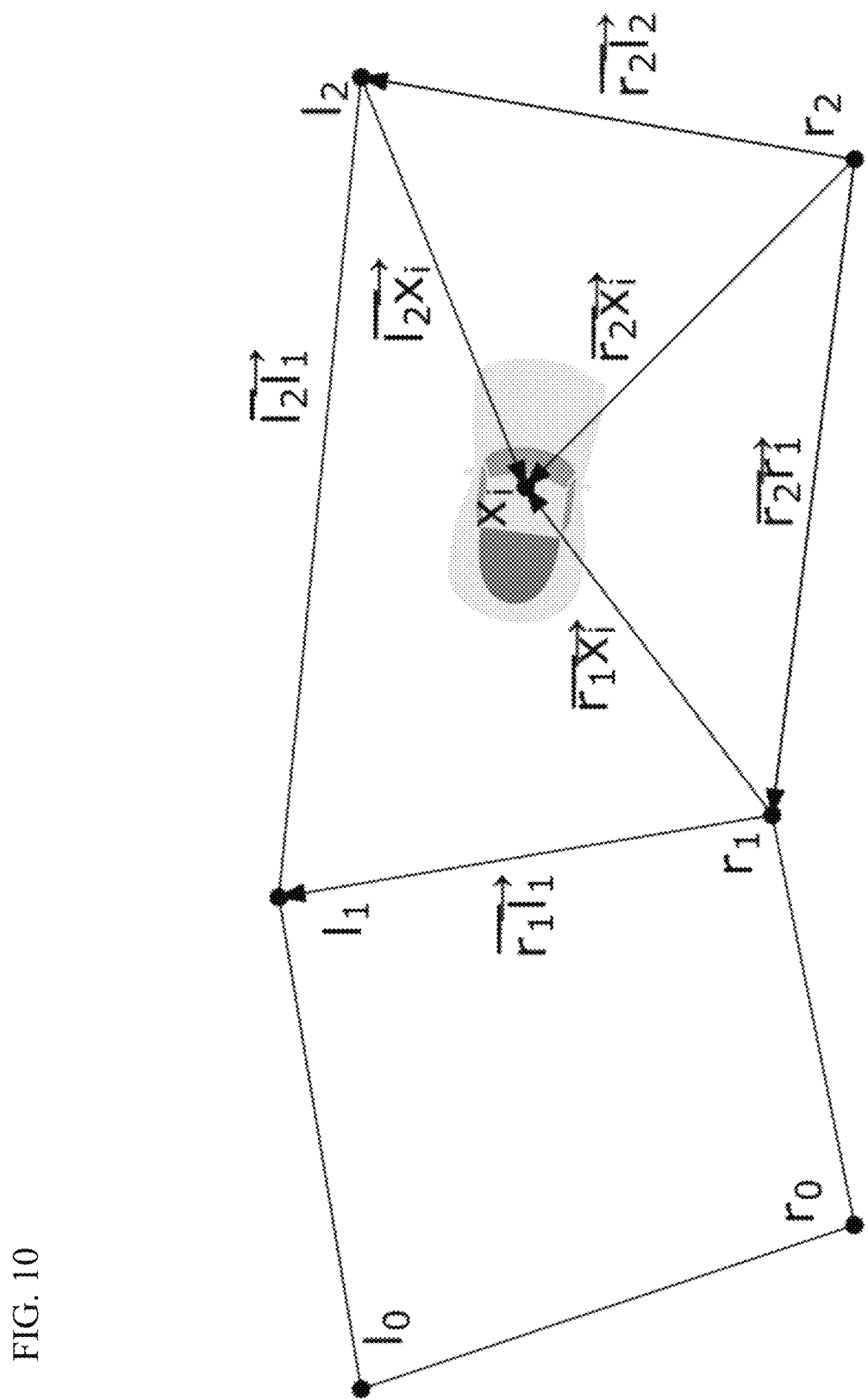
FIG. 10 shows relevant vectors used in establishing an active quadrangle of a driveable tube.

FIG. 10 shows the relevant vectors used in establishing the active quadrangle, and evaluating right and left edge boundary constraints.

A candidate state trajectory is considered valid if all discrete integration points are within the boundaries.

To evaluate if an integration state is within the lane boundaries, vector algebra is used both to determine the active quadrangle and to generate a constraint value. Consider FIG. 10, showing a standalone integration state and the relevant vectors. The first step is to identify the active quadrangle. Using matching indices of the left and right edge boundary, a vector is formed representing the transition from one quadrangle to the next. Consider the forward edge of the first quadrangle, denoted by $\vec{r_1 l_1}$, representing the vector from $r_1$ to $l_1$. Consider next the vector representing the position of the integration point, $x_i$, relative to the forward corner of the right quadrangle, $r_1$, denoted $\vec{r_1 x_i}$. The sign of the cross product $\vec{r_1 l_1} \times \vec{r_1 x_i}$ is used to indicate if the explicit integration state is in front of or behind the quadrangle. For the first quadrangle, this cross product is less than zero, indicating the integration point has progressed beyond that quadrangle.

Conversely, the cross product for the second quadrangle, $\vec{r_2 l_2} \times \vec{r_2 x_i}$ is greater than zero. The active quadrangle is established when this cross product crosses zero.

The requirement that the integration point must lie inside the edge boundaries is enforced through two individual constraints. Consider first the right edge constraint. A vector representing the right edge boundary, $\vec{r_2 r_1}$, is crossed with the position vector, resulting in $\vec{r_2 r_1} \times \vec{r_2 x_i}$. If the integration state is to the left of the right lane boundary, then the cross product will be negative. Thus, the right lane edge boundary constraint is considered to be valid if $\vec{r_2 r_1} \times \vec{r_2 x_i} \leq 0$.

Similarly for the left edge, $\vec{l_2 l_1}$ is crossed with the vehicle position relative to the forward left corner, $\vec{l_2 x_i}$, to form the constraint $\vec{l_2 x_i} \times \vec{l_2 x_1} \leq 0$. Note, the cross product order has been switched to maintain "≤0" as a valid constraint.

In general, each integration state, $x_i$, is contained within the fore and aft bounds of an active quadrangle k, where $r_k$, $r_{k+1}$, $l_{k+1}$, and $l_k$ form the four corners of the quadrangle. The right and left constraints are formed as follows.

$$d_r = \vec{r_k r_{k-1}} \times \vec{r_k x_i} \leq 0 \tag{28}$$

$$d_l = \vec{l_k x_i} \times \vec{l_k l_{k-1}} \leq 0 \tag{29}$$

Based on the formulation of (28) and (29), the left and right boundary must not be intersecting as well as branch-free, as both scenarios would result in unsolvable constraints.

By evaluating the lane boundary criteria through this vector algebra formulation, the discrete event of leaving the lane boundary can be captured in a continuous formulation.

This avoids a mixed integer optimization problem, allowing the underlying MPC optimization to be solved using gradient-based optimization. Details on calculating sensitivities for RK4 integration and related MPC problems can be found in [23].

The right and left edge constraints are enforced at every integration point in the prediction horizon. This can create a substantial number of constraints, all of which are loosely related to each other. To reduce the size of the numerical optimization problem, these multiple constraints are aggregated into two constraints through the KS function as follows [32].

$$KS(g, \rho_{edge}) = \frac{1}{\rho_{edge}} \ln\left(\sum_{i=1}^{n} e^{\rho_{edge} g_i}\right) \quad (30)$$

Here, g represents the vector of left or right edge boundary constraints throughout the prediction horizon, and $\rho_{edge}$ presents the aggregation parameter. Numerical simulation has shown $\rho_{edge}=80$ to be numerically stable.

Recall that one limitation of the state-of-the-art methods discussed above is the lateral deviation bounds have to be explicitly defined at each time step. Using the proposed active quadrangle approach, the trajectory bounds are a function of the x-y position, not necessarily the current time index. As the predicted state trajectory morphs during the optimization, the active quadrangle at a given time step may change, which is natively handled in the proposed methodology.

The final criterion for a successful CIS maneuver is dictating that the state trajectory is stable at the terminal state as well as stable throughout the prediction horizon. These constraints are derived in the next couple of subsections.

Terminal Position

One concern with a CIS maneuver is initiating a maneuver that is unrecoverable mid-maneuver. To avoid this, terminal state constraints are imposed to ensure a feasible solution sees the maneuver all the way through, and hence avoiding initiating a maneuver that may not be recoverable mid-trajectory.

The terminal state follows the same analysis presented in above, but with a couple of adjustments. For reference, $x_t$ represents the final integration state in the prediction horizon. Consider first the modified lane curvature.

The proposed CIS maneuver is a single lane change to avoid the collision and does not return to the original lane. A double lane change is possible, but would require a longer prediction horizon and thus a larger optimization problem.

For a single lane change to the outside, the terminal position is at a new lane curvature. For the new curvature, establishing stable terminal states mirrors the initial states discussed above. Similar to the initial states, the terminal states are generated from a pre-established road curvature. For implementation, road curvature can be estimated online, or the terminal state constraints can be established as needed.

$$x_{stable} [x \; y \; \psi \; u_0 \; v_t \; \omega_t \; \delta_{f,t} \; \delta_{r,t}]^T \quad (31)$$

Note that x, y, or $\psi$ in the terminal state do not have a subscript t, as these values are not directly enforced. This is because the numerical optimization problem does not know the terminal arc location of the state trajectory prior to simulating the control trajectory. Alternatively, the terminal x-y position is directly related to the terminal road curvature as follows.

$$(x_t-x_c)^2+(y_t-y_c)^2=r_t^2 \quad (32)$$

Similarly, the terminal heading is near tangential to the lane, corrected for the side slip.

$$\arctan\left(\frac{y_t-y_c}{x_t-x_c}\right) = \frac{\pi}{2} - \arctan\left(\frac{v_t}{u_0}\right) \quad (33)$$

Altogether, (31)-(33) form the stable terminal state. The second stability criterion, the vehicle remains stable throughout the maneuver, is defined through a tire slip constraint as follows.

Tire Slip Constraint

The nonlinear tire forces used in the MPC prediction model captures the force relaxation at high slip angles. Entering this relaxation region should be avoided, as the controller can quickly lose control authority [33].

To ensure tire stability, the peak tire slip angle is constrained within the stable region. Previous analysis has shown this stable tire region to be within $\alpha_{peak} \leq 8°$ for this tire parameter set [23]. This forms both a front tire slip constraint and a rear tire slip constraint enforced at every integration point.

$$\alpha_- = \delta_- - \arctan\left(\frac{v+\omega l_-}{u}\right) \; |\alpha_-| \leq \alpha_{peak} \quad (34)$$

Using a KS function similar to above, both the front and rear slip constraints are aggregated as follows.

$$KS(\alpha_-, \rho_{peak}) = \frac{1}{\rho_{peak}} \ln\left(\sum_{i=1}^{n} e^{\rho_{peak} |\alpha_{-,i}|}\right) \quad (35)$$

Objective Function

The fitness of a candidate CIS maneuver is maximum tire slip. By minimizing the maximum tire slip in the maneuver, the additional control authority the vehicle needs to make mid-maneuver corrections is maximized [32].

Using max and min functions in gradient based optimization should be avoided, as it introduces discrete changes, which is not well captured by the gradient. Instead, the KS function can smoothly capture the maximum value while maintaining differentiability.

To capture this, a new vector, $\alpha^*$, is formed, composed of the front and rear wheel slip angles at each integration point. The objective function is then formed as follows, with $\rho_{obj}=80$ having been numerically robust in simulation.

$$KS(\alpha^*, \rho_{obj}) = \frac{1}{\rho_{obj}} \ln\left(\sum_{i=1}^{2n} e^{\rho_{obj} |\alpha_i^*|}\right) \quad (36)$$

Next, the physical constraints on the vehicle are modeled.

Steering Angle and Steering Rate Constraint

The host vehicle has physical limitations on the allowable steering angle and steering rate. The front wheels are allowed a peak steering angle of $\delta_{f,max}=35°$, and a steering rate of $\dot{\delta}_{f,max}=70$ deg/s. The rear wheels do not have as much mobility, as they have a peak angle of $\delta_{r,max}=10°$, and steering rate of $\dot{\delta}_{r,max}=35$ deg/s. Conventional front-only steering is modeled by setting $\delta_r=0°$.

At this point, all of the constraints necessary to model the desired CIS maneuver and vehicle are established. These are then combined to form the numerical optimization problem.

Numerical Optimization Problem

The corresponding numerical optimization problem is formulated as follows.

$$\begin{aligned}
\min_{u} \quad & KS(\alpha^*, \rho_{obj}) & & (37) \\
\text{subject to} \quad & KS(d_r, \rho_{edge}) & \leq 0 \\
& KS(d_l, \rho_{edge}) & \leq 0 \\
& KS(\alpha_f, \rho_{peak}) & \leq \alpha_{peak} \\
& KS(\alpha_r, \rho_{peak}) & \leq \alpha_{peak} \\
& (x_t)_i - (x_{stable})_i & = 0 \,\forall\, i \in [4, 8] \\
& (x_t - x_c)^2 + (y_t - y_c)^2 & = r_{lane}^2 \\
& \arctan\left(\frac{y_t - y_c}{x_t - x_c}\right) & = \frac{\pi}{2} - \arctan\left(\frac{v_t}{u_0}\right) \\
& |\delta_-(t_i)| & \leq \delta_{-,max} \,\forall\, t_i \\
& |\dot{\delta}_-(t_i)| & \leq \dot{\delta}_{-,max} \,\forall\, t_i
\end{aligned}$$

Here, the system dynamic constraints are not explicitly introduced into the optimization problem, because these are directly incorporated by the RK4 integration. Any trajectory that satisfies the constraints of (37) is considered to be a valid CIS maneuver, and of the set of valid CIS maneuvers, the one with the smallest peak slip is considered to be the optimum.

In the next section, (37) is solved, and the resulting solutions are analyzed.

Numerical Simulation

Equation (37) can be solved with a variety of numerical solvers. For the solutions analyzed here, results were generated with IPOPT [34]. Solutions were found within 120 ms using a high performance desktop computer using a multiple shooting implementation with custom CUDA acceleration. FIGS. 11A-11D show the x-y trajectory of the CIS maneuver, as well as various vehicle states during the x-y trajectory.

Figures 11A, 11B:
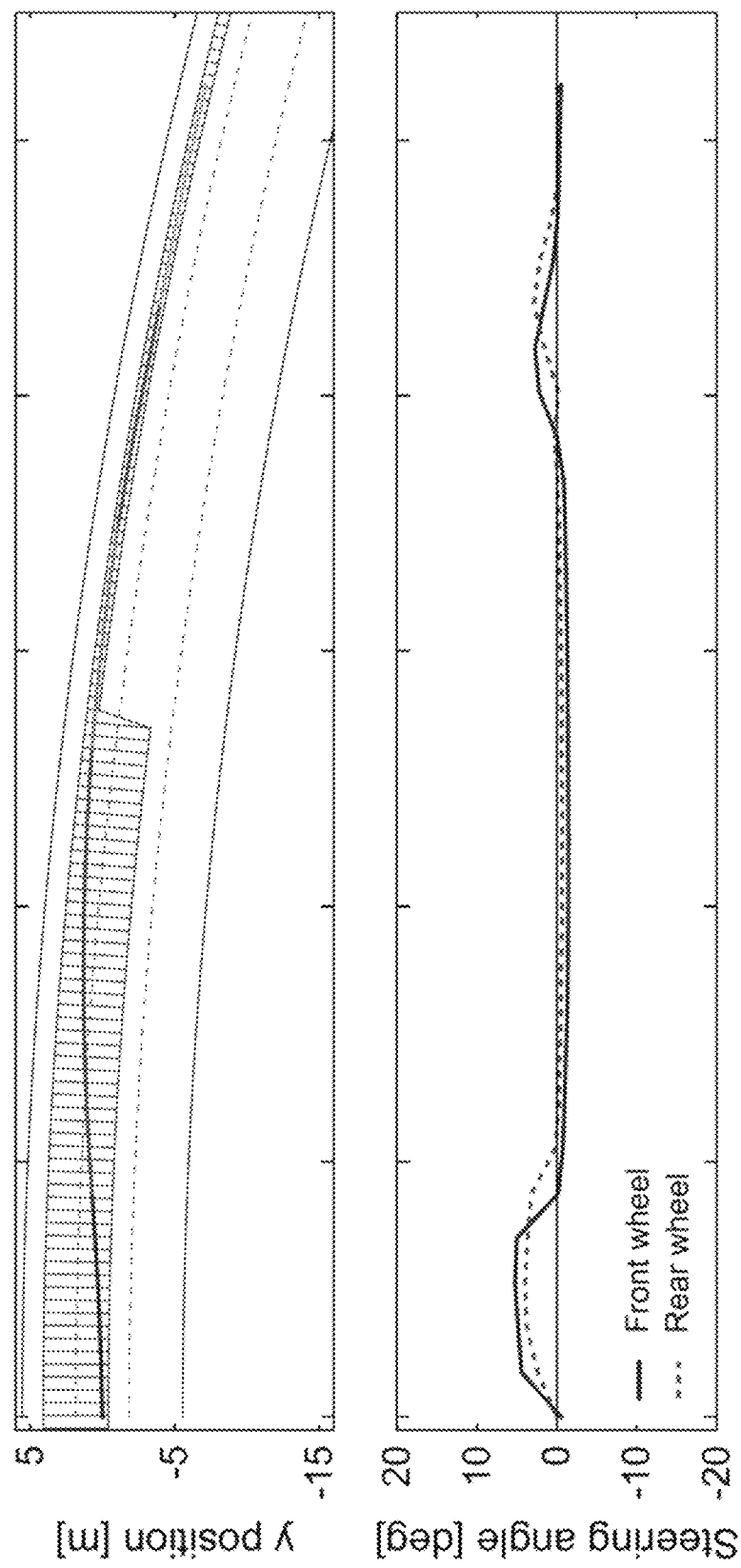
FIG. 11A shows an x-y trajectory of an exemplary collision imminent steering maneuver.
FIG. 11B shows the front and rear steering angles for the maneuver of FIG. 11A.
Figures 11C, 11D:
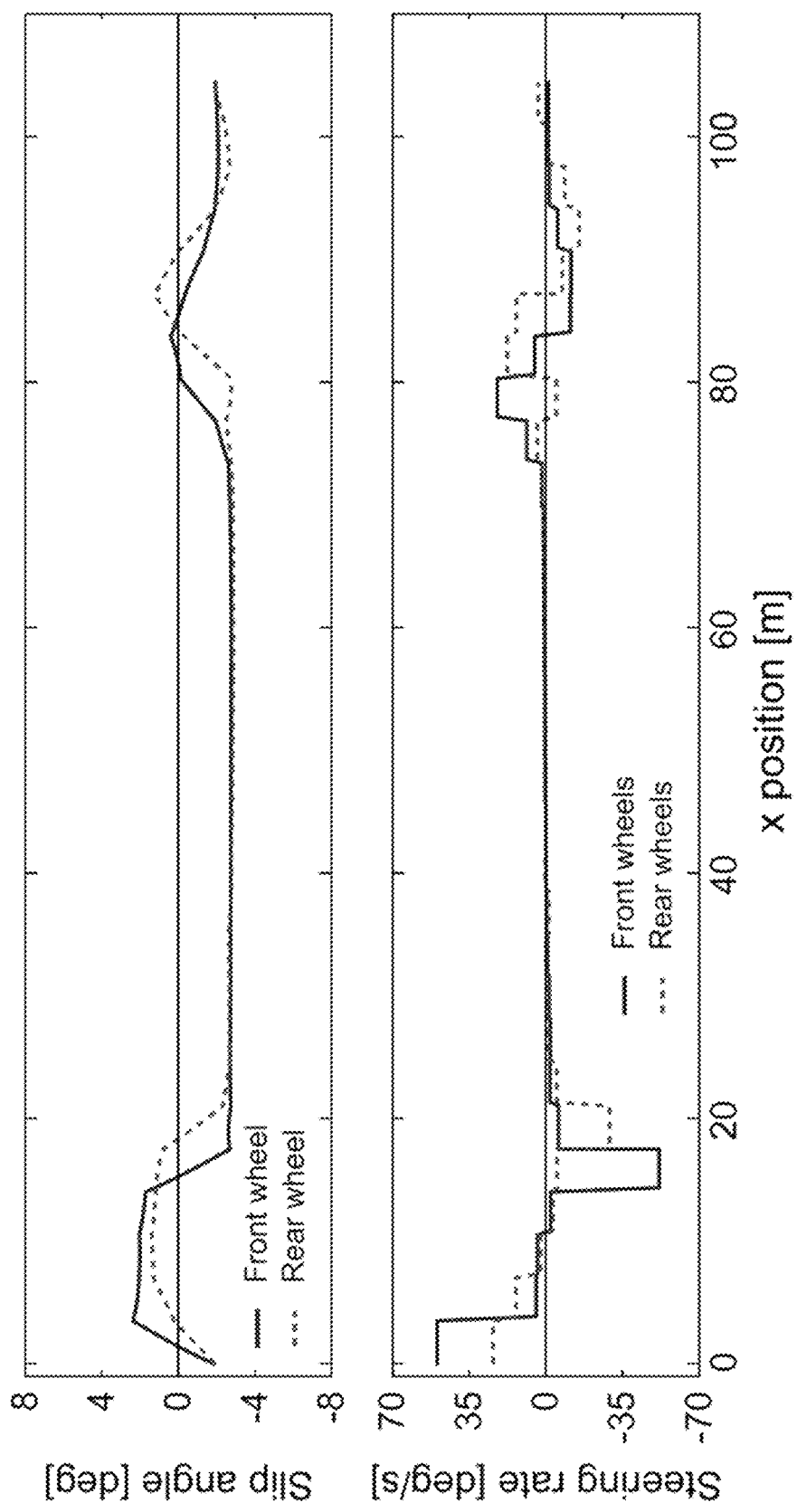
FIG. 11C shows the front and rear slip angles for the maneuver of FIG. 11A.
FIG. 11D shows the front and rear steering rates for the maneuver of FIG. 11A.

FIG. 11A shows the x-y trajectory CIS maneuver to the outside lane. FIG. 11B shows the front and rear steering angles for the maneuver of FIG. 11A. FIG. 11C shows the front and rear slip angles for the maneuver of FIG. 11A. FIG. 11D shows the front and rear steering rates for the maneuver of FIG. 11A.

The vehicle begins with a quick turn to the left, then continues with a long turn to the right. The outside lane change is a rather gradual maneuver. The vehicle begins the lane change by shortly steering to the left, setting up the vehicle for a second turn. Then, the vehicle makes a long, constant turn to the right, both avoiding the obstacle and obeying the outer lane boundary. At the end of the maneuver, the vehicle makes a small correction to reach the terminal states exactly, thus obeying all the constraints. The largest tire slip experienced for this CIS scenario is approximately 3°. During the outside lane change, the vehicle reaches 3 twice. The first instance is when the vehicle initially turns to the left, reaching positive 3°. Then, when making the constant turn to the right, the vehicle maintains −3° until the corrections at the end. Overall, the outside lane change is rather gradual, as it is a short turn to the left followed by a long turn to the right.

Compared to a straight road example, the outside lane change is a less aggressive maneuver and does not reach as high of a peak tire slip. However, for the outside lane change, it is possible that the obstacle occludes the lane information further down the road. Modifications to the geometrically defined drivable tube can simulate an inside lane change as well, which is comparably more aggressive than straight road, but avoids occlusion.

Example

This Example is provided in order to demonstrate and further illustrate certain embodiments and aspects of the present invention and is not to be construed as limiting the scope of the invention.

Referring now to FIG. 12, an exemplary embodiment of a driving control system 1200 is shown. The system includes a plurality of sensors are coupled to the ego vehicle 1205. The sensors can sense information associated with the ego vehicle 1205, and/or an object 1250. While depicted as a vehicle, the object 1250 can be other objects located longitudinally ahead of the ego vehicle 1205 such as a downed tree, one or more traffic cones blocking a lane, or another object that may need to be avoided using a lane change maneuver.

The plurality of sensors can include a first sensor 1210 that can be a speedometer, a global positioning system (GPS) sensor, or other applicable sensor configured to sense a speed and/or velocity of the ego vehicle 1205. Information about environmental surroundings of the ego vehicle 1205 such as a curvature of the roadway, maps of the roadway, location of lanes of the roadway, and/or a database of roadway information including information about the roadway at the current location of the ego vehicle 1205. The GPS sensor may also provide traffic information about the roadway such as lane closures, vehicle accidents, stopped vehicles ahead of the ego vehicle 1205 with respect to general traffic flow on the roadway, or other relevant information about traffic on the roadway.

The first sensor can be coupled to a controller 1240 having a memory and a processor and coupled to the ego vehicle 1205. The controller 1240 can have a lane change algorithm stored in the memory, which will be explained in detail in FIGS. 13 and 14. The controller 1240 can be coupled to a vehicle control system (not shown) of the ego vehicle 1205. In some embodiments, the controller 1240 can be coupled to the vehicle control system via a Controller Area Network (CAN) bus. The vehicle control system can be an autonomous or semi-autonomous vehicle control system with any number of controllers, interfaces, actuators, and/or sensors capable of controlling a motor, engine, transmission, braking system, steering system, or other subsystem of the ego vehicle. The vehicle control system can be used to perform a vehicle maneuver such as a lane changing maneuver, changing the speed the ego vehicle 1205 by controlling the braking and/or throttle of the ego vehicle 1205, controlling the steering of the front and/or rear wheels of the ego vehicle 1205, or controlling the movement (i.e. speed, acceleration, direction of travel, etc.) of the ego vehicle 1205 via one or more subsystems of the ego vehicle 1205. The vehicle control system may be capable of controlling the steering of the front and/or rear wheels based on steering rates, which may be formulated in radians per second. The vehicle control system can include a steering control subsystem capable of moving the front and/or rear wheels at a given steering rate. In some embodiments, the controller 1240 can be coupled to a wireless network such as a cellular network or satellite network in order to establish an internet connection and/or receive traffic information. In some embodiments, the controller 1240 can be coupled to a smartphone capable of providing an internet connection and/or traffic information to the controller 1240.

The vehicle control system can control components such as the motor, engine, transmission, braking system, steering system, or other subsystem, based on information received from sensors coupled to driver inputs devices such as a brake pedal, accelerator pedal, steering wheel, gear shifter, etc. in order to execute the vehicle maneuver. For example, the vehicle control system can control the motor or engine based on information received from a sensor coupled to the accelerator pedal. The vehicle control system can also control the above components based on commands received from a collision imminent steering process, which will be described below In some embodiments, the controller 1240 may be a portion of the vehicle control system.

The plurality of sensors can include a second sensor 1220 coupled to the controller 1240 and configured to sense surroundings of the ego vehicle 1205. The second sensor 1220 can be a sensor such as a LiDAR sensor, a camera such as an infrared camera or visible light camera, an ultrasonic sensor, a radar sensor, or any other type of sensor capable of sensing the location, speed, and/or velocity of objects around the ego vehicle 1205. The second sensor 1220 may sense information about a location, speed, or velocity of the object 1250. The information, either directly or indirectly, may be used by the controller 1240 to calculate a location of the object 1250 relative to the ego vehicle 1205, a headway distance and/or longitudinal distance between the object 1250 and the ego vehicle 1205, a lateral velocity or acceleration of the object 1250, a longitudinal velocity or acceleration of the object 1250, a lateral location of the ego vehicle 1205, and/or a lateral location of the object 1250. Lateral location can be the location of the vehicle within a width of a lane such as $y_{lane}$ of a roadway or the location along the y direction shown in FIG. 2 or FIG. 9, while longitudinal location can be the location of the vehicle along the x direction shown in FIG. 2 or FIG. 9. The second sensor 1220 can be used to detect a location of one or more objects located longitudinally ahead of the ego vehicle 1205 in the same lane that the ego vehicle 1205 is traveling along or in a lane adjacent to the lane the ego vehicle 1205, or determine that there are no objects in a lane adjacent to the lane the ego vehicle 1205 is traveling along. The location of one or more objects located in an adjacent lane to the lane the ego vehicle 1205 can be used to determine the feasibility of a driving maneuver in order to ensure that the ego vehicle 1205 has room to maneuver around an obstacle located longitudinally ahead in the lane the vehicle is traveling in.

The second sensor 1220 can be used to detect roadway markings such as an outer roadway boundary, which can be a shoulder lane stripe, an inner roadway boundary, which can be a shoulder lane stripe, a lane divider marking such as a dashed line, or other markings used to mark roadways. The roadway markings can include materials such as paint or reflective plastic strips.

The second sensor 1220 can be capable of sensing a speed or velocity of an object natively. Alternatively, the speed or velocity of the object can be calculated by the controller 1240 information sensed by the sensor using methods known in the art, such as determining a velocity of a vehicle from location information sensed by a LiDAR sensor.

Any number of first sensors 1210, and second sensors 1220, can be coupled to the ego vehicle 1205 in order to improve the speed, velocity, and/or object location sensing capabilities of the ego vehicle 1205. For example, multiple second sensors 1220*a* and 1220*b* can be mounted to the front of the ego vehicle 1205. At least one second sensor can be mounted to the rear of the ego vehicle 1205, as indicated by second sensor 1220*c*. Second sensor 1220*c* can be used to sense the location of the object 1250 when the ego vehicle 1205 is ahead of the object 1250, i.e. when the ego vehicle 1205 is almost done overtaking the object 1250. The second sensors 1220 may include different sensor types, i.e., some of the second sensors 1220 are cameras while others are LiDAR sensors. The plurality of sensors can be divided up as a number of sub-pluralities of sensors, i.e., a first plurality of sensors, a second plurality of sensors, and a third plurality of sensors. Some of the sub-pluralities of sensors may share sensors or have a common sensor, i.e., a sensor may belong to the first plurality of sensors and the second plurality of sensors. In some embodiments, both the first plurality of sensors and the second plurality of sensors can include a speedometer. It is contemplated that a single sensor capable of sensing all of the parameters described above could be used in place of the first sensor 1210 and the second sensor 1220. Additionally, multiple controllers 1240 may be used in order to implement the driving control system 1200.

Figure 13:
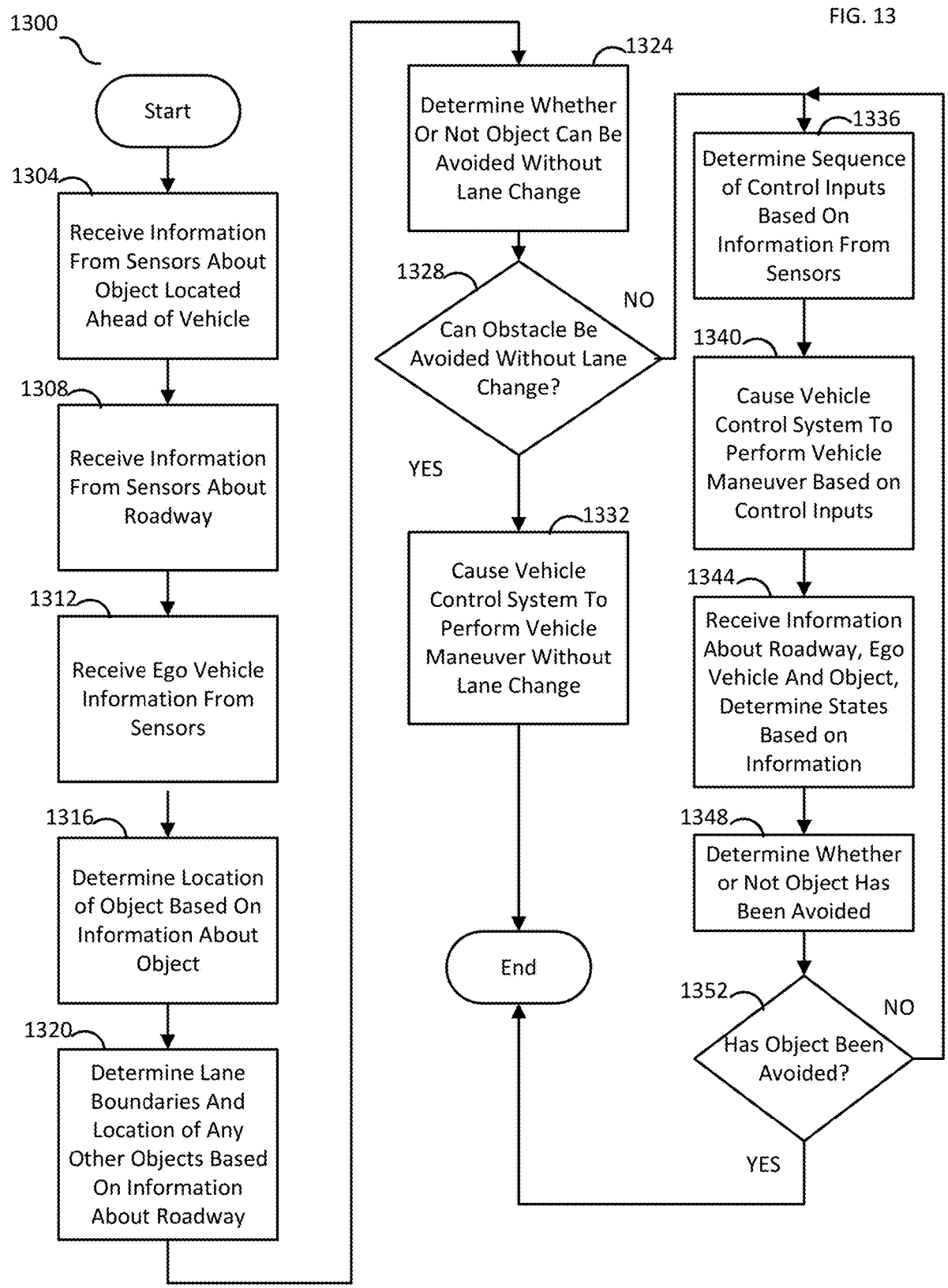
FIG. 13 shows an exemplary embodiment of process for implementing a lane changing system.

Referring now to FIG. 12 as well as FIG. 13, an exemplary embodiment of process 1300 for implementing a lane changing system in order to allow an ego vehicle to avoid an obstacle that may not be avoided by braking alone.

The process 1300 can be implemented as instructions on a memory of a computational device such as the controller 1240 in communication with the first sensors 1210 and the second sensors 1220 coupled to the ego vehicle 1205 as described above. The first sensors 1210 and the second sensors 1220 can be referred to as a plurality of sensors below.

At 1304, the process 1300 can receive object information about an object located longitudinally ahead of the ego vehicle from at least one of the plurality of sensors coupled to the ego vehicle. The object may be located in the same lane of the roadway as the ego vehicle. The object may be a stationary object such as a stopped vehicle, a downed tree, one or more traffic cones blocking a lane, or another object that may need to be avoided using a lane change maneuver, or a non-stationary object such as a moving vehicle. In some embodiments, the object can be the end of a lane such as the end of an on-ramp merge lane, where a lane change may be required to stay on the roadway. The object information can be used to determine a location of the object relative to the ego vehicle such as a longitudinal distance between the front of the ego vehicle and a portion of the object longitudinally closest (i.e. along the x direction) to the front of the ego vehicle. The object information can also be used to determine a velocity of the object. Some objects such as traffic cones may have a velocity of about zero, while some objects such as vehicles may have a non-zero velocity and may be moving along the roadway. The object information can be used to determine the location and/or velocity of the object using one or more radar sensors, LiDAR sensors, and/or cameras using methods known in the art. The process 1300 can also receive traffic information about the roadway such as lane closures, vehicle accidents, stopped vehicles ahead of the ego vehicle with respect to general traffic flow on the roadway, or other relevant information about traffic on the roadway from a GPS sensor or a smartphone. The traffic information can be used to determine a location of an object such as a stopped vehicle or barriers such as traffic cones blocking the lane the ego vehicle is traveling along. The process 1300 can then proceed to 1308.

At 1308, the process 1300 can receive roadway information about a roadway the ego vehicle is traveling on from at least one of the plurality of sensors coupled to the ego vehicle. The roadway information can be used to directly or indirectly determine lane boundaries of the roadway, number of lanes of the roadway, traffic information about the roadway such as lane closures or traffic accidents, locations of objects located in lanes other than the lane the ego vehicle is traveling in. Information about roadway markings such as an outer roadway boundary, which can be marked by a shoulder lane stripe, an inner roadway boundary, which can be marked by a shoulder lane stripe, a lane boundary marked by a lane marking such as a dashed line, or other markings used to mark roadways can be received from one or more sensors such as cameras. The process 1300 can also receive information about outer roadway boundaries, inner roadway boundaries, and/or lane divider markings from a GPS sensor or a smartphone. The process 1300 can also receive information about locations and/or velocities of objects located in lanes adjacent to the lane the ego vehicle is traveling from certain sensors such as radar sensors, LiDAR sensors, and/or cameras. The process 1300 can also receive information about the lack of objects in the adjacent lanes from certain sensors such as radar sensors, LiDAR sensors, and/or cameras. The process 1300 can then proceed to 1312.

At 1312, the process 1300 can receive ego vehicle information about the ego vehicle from at least one sensor coupled to the ego vehicle. The ego vehicle information can be used to determine a velocity of the ego vehicle. The velocity can be determined using information received from a speedometer or a GPS sensor. The ego vehicle information can also include information about environmental conditions surrounding the ego vehicle such as weather conditions including a temperature value and/or a rainfall value. The information about environmental conditions can be received from sensors such as a temperature sensor and a rain sensor coupled to a windshield of the ego vehicle. It is contemplated that information about weather conditions could also be received from a remote source via a smartphone. The ego vehicle information can be used to determine whether or not the ego vehicle can avoid an object without a lane change maneuver as will be described below. The process 1300 can then proceed to 1316.

At 1316, the process 1300 can determine a location of the object located longitudinally ahead of the ego vehicle based on the object information. The object may be located in the same lane of the roadway the ego vehicle is traveling along. The process 1300 can also determine a velocity of the object based on the object location. As described above, the object information can be used to determine a location of the object relative to the ego vehicle such as a longitudinal distance between the front of the ego vehicle and a portion of the object longitudinally closest (i.e. along the x direction) to the front of the ego vehicle. The velocity of the object can include a longitudinal velocity along the x direction of the roadway and a lateral velocity along the y direction of the roadway. The location and/or velocity of the object can be used to determine if the ego vehicle should perform a lane change as will be described below. The process 1300 can then proceed to 1320.

At 1320, the process 1300 can determine the outer roadway boundary, the inner roadway boundary, and one or more lane boundaries of the roadway and/or location(s) of any objects located in lanes of the roadway other than the lane the ego vehicle is traveling along based on the roadway information. The outer roadway boundary, the inner roadway boundary, and the one or more lane boundaries can be determined by determining the location of markings such as shoulder stripes or dashed lines that mark the various boundaries as described above. Lane widths can also be determined based on the roadway information. The lane width $y_{lane}$ can be determined by calculating the distance between a lane boundary and another boundary such as the outer roadway boundary, the inner roadway boundary, or another lane boundary. An outer lane boundary $y_{outer}$ can also be calculated using equation (2) as described above based on a predetermined width of the ego vehicle $w_v$, a predetermined safety margin σ, and the lane width $y_{lane}$. The process 1300 can also determine if there are any objects located in one or more lanes adjacent to the lane the ego vehicle is traveling along based on the roadway information. For example, the process 1300 can determine that images received from a camera oriented towards an adjacent lane do not contain any objects within a portion of the lane that the camera can sense. As another example, the process 1300 can determine that information from a radar sensor oriented towards an adjacent lane is indicative that a radio wave was not reflected back to the radar sensor, and that the adjacent lane does not contain any objects within a portion of the lane that the radar sensor can sense. If an object is present in an adjacent lane, the roadway information can be used to determine the location and/or velocity of the object using methods known in the art. The process 1300 can also determine the location of the ego vehicle on the roadway, which may include the location of the ego vehicle in relation to the one or more lane boundaries, based on the roadway information. The process 1300 can then proceed to 1324.

At 1324, the process 1300 can determine whether or not an object located longitudinally ahead of the ego vehicle can be avoided without a lane change maneuver based on the object information, the roadway information, and the ego vehicle information. The process 1300 can determine if the ego vehicle can stop before a potential collision with the object, which may be located in the same lane as the ego vehicle. The process 1300 can determine a stopping distance for the ego vehicle based on the velocity of the ego vehicle. The process may provide the velocity of the ego vehicle to a stopping distance model and receive a stopping distance value from the stopping distance model. The stopping distance model may include a lookup table including a plurality of stopping distances at a plurality of velocities, the plurality of stopping distances being determined using manufacturer test data. The stopping distance model may be configured to accept other input values such as a temperature value and/or a rainfall value. Temperature and the presence of rain may affect the stopping distance of the ego vehicle at a given speed, and the additional information may be used to provide a more accurate stopping distance. The stopping distance model may also be configured to output a stopping time value indicating how long it will take the ego vehicle to stop from the current ego vehicle velocity. After the stopping distance value and/or stopping time value has been determined, the process 1300 can determine if the ego vehicle will be able to stop before a potential collision with the object. If the object has a velocity of about zero, the process 1300 can determine if the stopping distance value is greater than the distance between the front of the ego vehicle and the object, the ego vehicle may have to perform a lane change maneuver to avoid the object. The process 1300 can also determine that the ego vehicle may have to perform a lane change maneuver to avoid the object is the object has a velocity below a predetermined threshold, for example 10 m/s, which may indicate the vehicle is stopping or operating below a speed limit of a highway. The process 1300 can determine if there any objects in an adjacent lane that the ego vehicle may maneuver to within a threshold distance using information received from the sensors. During a lane change maneuver, the ego vehicle may change lanes and continue along the roadway at about the same velocity as before the maneuver was performed. In order to safely perform the maneuver, the process 1300 can determine that the adjacent lane is sufficiently clear of objects in order to change lanes without potentially colliding with an object in the adjacent lane. The process 1300 can determine that there are not any objects located within a longitudinal distance equal to how far the ego vehicle will travel in a predetermined time, such as about 2.5 s, at the current ego vehicle velocity. If the process 1300 determines that a collision cannot be avoided by braking alone and the object and that the adjacent lane is sufficiently clear of objects, the process 1300 can determine that the object cannot be avoided without a lane change maneuver. If the process 1300 determines that the object can be avoided without a lane change maneuver, the process can take alternative action, such as avoiding the obstacle by simply causing the ego vehicle to stay in the current lane and brake until stopped. The process can then proceed to 1328.

At 1328, if the process 1300 determined that the object can be avoided without a lane change maneuver ("YES" at 1328), the process 1300 can proceed to 1332. If the process 1300 determined that the object cannot be avoided without a lane change maneuver ("NO" at 1328), the process 1300 can proceed to 1336.

At 1332, the process 1300 can cause a vehicle control system of the ego vehicle to perform a vehicle maneuver without a lane change. The process 1300 may cause the vehicle control system to keep the ego vehicle traveling along the same lane and brake sufficiently to avoid a collision with the object. The process 1300 can then end.

At 1336, the process 1300 can determine a sequence of control inputs to avoid a collision between the ego vehicle and the object. The sequence of control inputs can be used to maneuver the ego vehicle to an adjacent lane. The process 1300 can determine the sequence of control inputs by using information and/or parameters of the ego vehicle, the roadway, and the object to calculate values for unknown parameters used explicitly or implicitly in solving equation (22). In order to update the values of variables and/or parameters used in solving equation (22) and that may not be known until runtime (i.e. the distance between the front of the ego vehicle and the object), the process 1300 can utilize at least a portion of the ego vehicle information, the object information, the roadway information, and any parameters calculated based on the ego vehicle information, the object information, the roadway information in order to determine a sequence of control inputs for the current driving scenario. Some unknown parameters, such as $y_{boundary}$ can be determined based on information received from sensors, such as the roadway information. The process 1300 may utilize the lane width, the ego vehicle velocity, the distance between the front of the ego vehicle and the object, the location of the ego vehicle on the roadway, one or more lane boundaries, the outer roadway boundary, and the inner roadway boundary to calculate parameters used in equation (22). The process 1300 may also utilize predetermined data such as tire data, ego vehicle manufacturer data, steering angle limits, and steering rate limits to calculate or directly supply values for parameters used in equation (22). In some embodiments, the predetermined data can be provided to the process 1300 in order to update certain parameters of equation (22) before the ego vehicle is driving on the roadway to eliminate the step of providing the data during execution of the process 1300. The process 1300 can then determine the values of various parameters used in solving equation (22), such as the distances shown in FIG. 2, based on the parameters provided. The process 1300 can then solve equation (22) using a nonlinear optimization technique.

Each control input u can in the sequence of control inputs can be associated with a fixed timed interval, for example 100 ms. The length of the time interval can be chosen based on how quickly a steering subsystem of the vehicle can implement commanded steering rates. Each control input u can be formatted as a front steering rate $\dot{\delta}_f$ corresponding to a steering rate of front tires of the ego vehicle, and a rear steering rate $\dot{\delta}_r$ corresponding to a steering rate of rear tires of the ego vehicle as shown in equation (4) above. The sequence of control inputs can be calculated over a predetermined time horizon $t_h$ as described above, which may be about 2.5 s, and correspond to twenty five consecutive control inputs lasting 100 ms. System dynamics, which can be calculated at a given time using equations (3)-(6) above, can be calculated at predetermined time steps $t_s$ which may be about 10 ms, over the time horizon $t_h$ using an integration methodology, such as forward Euler integration.

A tire slip angle of a wheel can be calculated based on the lateral velocity of the ego vehicle, the yaw rate of vehicle, the distance of the wheel to a center of gravity of the vehicle, and the longitudinal velocity of the vehicle using equation (13). The process 1300 can calculate a score for a sequence of tire slip values (which are associated with a sequence of control inputs) over the time horizon $t_h$ using equation (14) above.

During the solving of the optimization problem posed by equation (22), the process 1300 can evaluate a given sequence of control inputs (which may also be referred to as a control trajectory) as for fitness and feasibility before potentially updating the sequence of control inputs to improve the fitness and/or feasibility of the control inputs. The process 1300 can find the fittest control input sequence. The fitness of the sequence of control inputs is related to the maximum tire slip angle at the front wheels or rear wheels during the time horizon $t_h$, and lower maximum tire slip angles correspond to more fit solutions. The feasibility of the sequence of control inputs is related to the constraints imposed by equation (22) which will be described below. The process 1300 can use the constraints to determine the fittest sequence of control inputs that is also feasible. In other words, the process 1300 can minimize the maximum tire slip angle experienced during the time horizon $t_h$ while also providing a solution that satisfies a given set of constraints.

The constraints included in equation (22) may include a separation requirement between the ego vehicle and the object at the longitudinal location of the object, which can be enforced by $\text{offset}_{fixed\ distance}(x_j, x_{j+1}) \leq 0$, a minimum lateral distance to be maintained between the ego vehicle and the outer roadway boundary, which can be enforced by $KS(y, \rho_{lane}, y_{boundary}) \leq 0$, a maximum front wheel tire slip value, which can be enforced by $KS(y_{front}, \rho_{front}, \alpha_{front, peak}) \leq 0$ a maximum rear wheel tire slip value, which can be enforced by $KS(\alpha_{rear}, \rho_{rear}, \alpha_{rear, peak}) \leq 0$, a requirement that the front steering angle value of the ego vehicle be no greater than a predetermined value such as zero at the end of the time horizon $t_h$ and the lateral velocity of the ego vehicle be no greater than a predetermined value such as zero degrees and zero meters per second respectively, which can be enforced by $x(t_h)_i - (x_{final})_i = 0 \ \forall i \in [2,8]$, and keeping the steering angles and steering rates throughout the time horizon $t_h$ at or below the physical limits of steering angles and steering rates of the ego vehicle, which can be constrained by $|\delta_f(t_i)| \leq \delta_{front, max}$, $|\delta_r(t_i)| \leq \delta_{rear, max}$, $|\dot{\delta}_f(t_i)| \leq \dot{\delta}_{front, max}$, and $|\dot{\delta}_r(t_i)| \leq \dot{\delta}_{rear, max}$. The lateral velocity and the front steering angle value of the ego vehicle can be constrained to values other than zero meters per second and zero degrees, for example one tenth of a meter per second and two degrees respectively, by allowing the $x_{final}$ values at indices five and seven to be $\leq 0.1$ and $\leq 0.0349$ (i.e. two degrees in radians) respectively. The forward velocity of the vehicle may remain about the same during the time horizon $t_h$ in accordance with testing procedures. The process can then proceed to 1340.

At 1340, the process 1300 can cause a vehicle control system of the ego vehicle to perform a vehicle maneuver based on the sequence of control inputs. As described above, the sequence of control inputs can be formatted as steering rates for front and/or rear wheels of the ego vehicle. The process 1300 can provide the sequence of steering rates to the vehicle control system, which can then steer the front wheels and/or rear wheels (depending on if the ego vehicle supports rear wheel steering) at the steering rate specified by the sequence of steering rates at a given time during the time horizon $t_h$. The steering rates may remain the same for a predetermined time, for example 100 ms. The process 1300 can proceed to 1344.

At 1344, the process 1300 can receive information about the roadway, the ego vehicle, and the object, and determine the general state of the roadway, the ego vehicle, and the object. At 1344, at least a portion, such as all, of steps 1304-1320 can be performed as described above. The process 1300 can then proceed to 1348.

At 1348, the process 1300 can determine whether or not the object has been avoided. Using the information about the object and/or the state of the object, the process 1300 can determine if the ego vehicle is longitudinally past the front of the object and laterally clear of the object, which may indicate the ego vehicle has passed the object and can continue driving along the roadway without performing a CIS maneuver. Otherwise, the vehicle may not have passed the object. The process 1300 can then proceed to 1352.

At 1352, if the process 1300 determined that the object has been avoided by the ego vehicle ("YES" at 1352), the process 1300 can proceed to end. If the process 1300 determined that the object has been avoided by the ego vehicle ("NO" at 1328), the process 1300 can proceed to 1336. In this way, the process 1300 can update the sequence of control maneuvers determined in 1336 based on the current information received and/or states determined in 1344.

Figure 14:
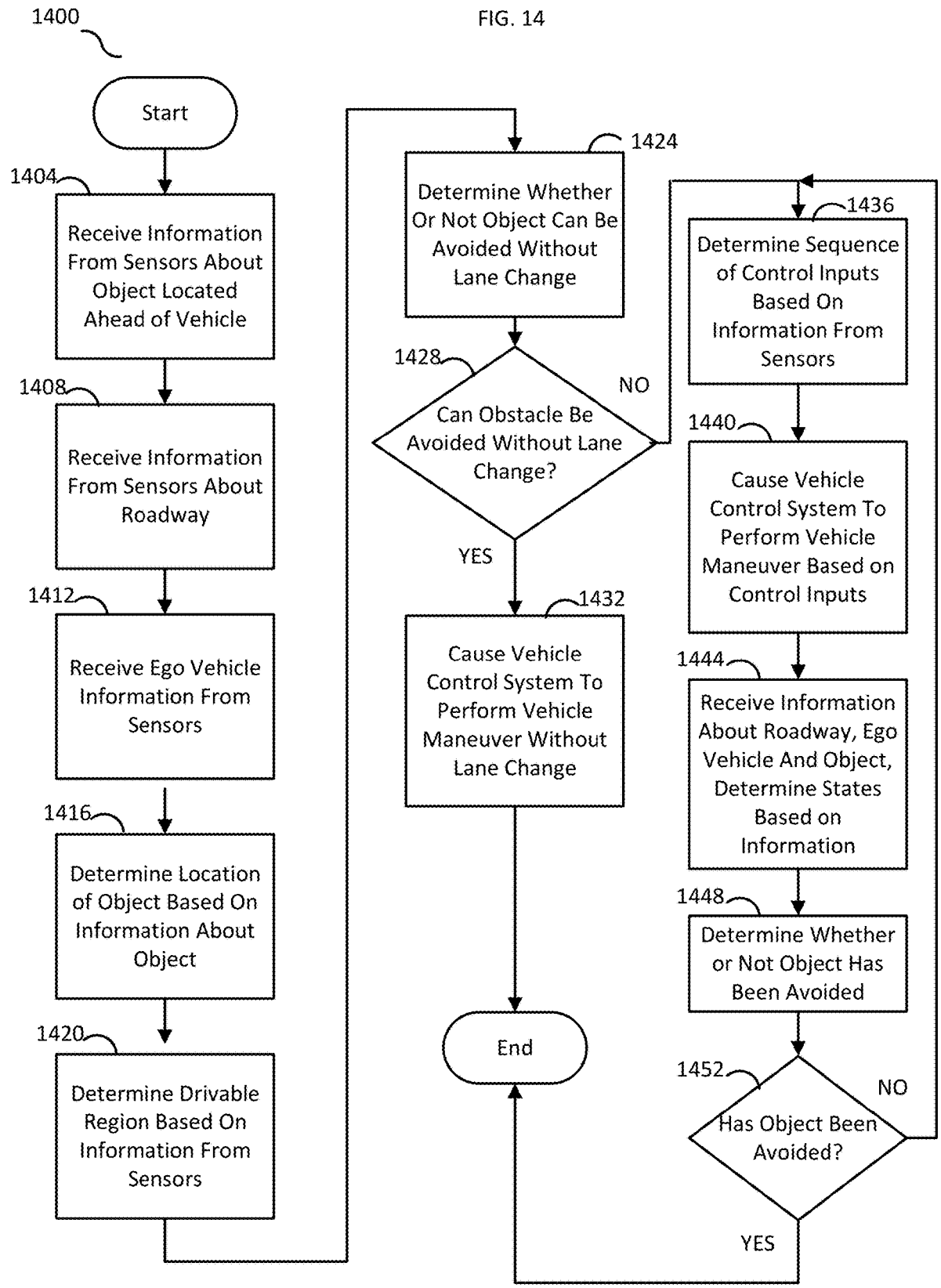
FIG. 14 shows another exemplary embodiment of process for implementing a lane changing system.

Referring now to FIG. 12 as well as FIG. 14, an exemplary embodiment of process 1400 for implementing a lane changing system in order to allow an ego vehicle to avoid an obstacle that may not be avoided by braking alone. More specifically, the process 1400 can be implemented in certain environments with curved roads.

The process 1400 can be implemented as instructions on a memory of a computational device such as the controller 1240 in communication with the first sensors 1210 and the second sensors 1220 coupled to the ego vehicle 1205 as described above. The first sensors 1210 and the second sensors 1220 can be referred to as a plurality of sensors below.

At 1404, the process 1400 can receive object information about an object located longitudinally ahead of the ego vehicle from at least one of the plurality of sensors coupled to the ego vehicle. The object may be located in the same lane of the roadway as the ego vehicle. The object may be a stationary object such as a stopped vehicle, a downed tree, one or more traffic cones blocking a lane, or another object that may need to be avoided using a lane change maneuver, or a non-stationary object such as a moving vehicle. In some embodiments, the object can be the end of a lane such as the end of an on-ramp merge lane, where a lane change may be required to stay on the roadway. The object information can be used to determine a location of the object relative to the ego vehicle such as a longitudinal distance between the front of the ego vehicle and a portion of the object longitudinally closest (i.e. along the x direction) to the front of the ego vehicle. The object information can also be used to determine a velocity of the object. Some objects such as traffic cones may have a velocity of about zero, while some objects such as vehicles may have a non-zero velocity and may be moving along the roadway. The object information can be used to determine the location and/or velocity of the object using one or more radar sensors, LiDAR sensors, and/or cameras using methods known in the art. The process 1400 can also receive traffic information about the roadway such as lane closures, vehicle accidents, stopped vehicles ahead of the ego vehicle with respect to general traffic flow on the roadway, or other relevant information about traffic on the roadway from a GPS sensor or a smartphone. The traffic information can be used to determine a location of an object such as a stopped vehicle or barriers such as traffic cones blocking the lane the ego vehicle is traveling along. The process 1400 can then proceed to 1408.

At 1408, the process 1400 can receive roadway information about a roadway the ego vehicle is traveling on from at least one of the plurality of sensors coupled to the ego vehicle. The roadway information can be used to directly or indirectly determine lane boundaries of the roadway, number of lanes of the roadway, traffic information about the roadway such as lane closures or traffic accidents, locations of objects located in lanes other than the lane the ego vehicle is traveling in. Information about roadway markings such as an outer roadway boundary, which can be marked by a shoulder lane stripe, an inner roadway boundary, which can be marked by a shoulder lane stripe, a lane boundary marked by a lane marking such as a dashed line, or other markings used to mark roadways can be received from one or more sensors such as cameras. The process 1400 can also receive information about outer roadway boundaries, inner roadway boundaries, and/or lane divider markings from a GPS sensor or a smartphone. The process 1400 can also receive information about locations and/or velocities of objects located in lanes adjacent to the lane the ego vehicle is traveling from certain sensors such as radar sensors, LiDAR sensors, and/or cameras. The process 1400 can also receive information about the lack of objects in the adjacent lanes from certain sensors such as radar sensors, LiDAR sensors, and/or cameras. The process 1400 can then proceed to 1412.

At 1412, the process 1400 can receive ego vehicle information about the ego vehicle from at least one sensor coupled to the ego vehicle. The ego vehicle information can be used to determine a velocity of the ego vehicle. The velocity can be determined using information received from a speedometer or a GPS sensor. The ego vehicle information can also include information about environmental conditions surrounding the ego vehicle such as weather conditions including a temperature value and/or a rainfall value. The information about environmental conditions can be received from sensors such as a temperature sensor and a rain sensor coupled to a windshield of the ego vehicle. It is contemplated that information about weather conditions could also be received from a remote source via a smartphone. The ego vehicle information can be used to determine whether or not the ego vehicle can avoid an object without a lane change maneuver as will be described below. The process 1400 can then proceed to 1416.

At 1416, the process 1400 can determine a location of the object located longitudinally ahead of the ego vehicle based on the object information. The object may be located in the same lane of the roadway the ego vehicle is traveling along. The process 1400 can also determine a velocity of the object based on the object location. As described above, the object information can be used to determine a location of the object relative to the ego vehicle such as a longitudinal distance between the front of the ego vehicle and a portion of the object longitudinally closest (i.e. along the x direction) to the front of the ego vehicle. The velocity of the object can include a longitudinal velocity along the x direction of the roadway and a lateral velocity along the y direction of the roadway. The location and/or velocity of the object can be used to determine if the ego vehicle should perform a lane change as will be described below. The process 1400 can then proceed to 1420.

At 1420, the process 1400 can determine a drivable region based on the roadway information and the object information. The drivable region can be the driving tube as described above. The drivable region can have a left boundary and a right boundary. The left boundary and/or the right boundary can follow a curve of the roadway, which can allow maximum tire slip experienced during a lane change maneuver to be minimized. The drivable region may be contained within a single lane near the obstacle. The drivable region can also be determined using locations of other objects if any objects located in lanes of the roadway other than the lane the ego vehicle is traveling along based on the roadway information. The drivable region can include a plurality of quadrangles as described in conjunction with the driving tube above. The process 1400 can then proceed to 1424.

At 1424, the process 1400 can determine whether or not an object located longitudinally ahead of the ego vehicle can be avoided without a lane change maneuver based on the object information, the roadway information, and the ego vehicle information. The process 1400 can determine if the ego vehicle can stop before a potential collision with the object, which may be located in the same lane as the ego vehicle. The process 1400 can determine a stopping distance for the ego vehicle based on the velocity of the ego vehicle. The process may provide the velocity of the ego vehicle to a stopping distance model and receive a stopping distance value from the stopping distance model. The stopping distance model may include a lookup table including a plurality of stopping distances at a plurality of velocities, the plurality of stopping distances being determined using manufacturer test data. The stopping distance model may be configured to accept other input values such as a temperature value and/or a rainfall value. Temperature and the presence of rain may affect the stopping distance of the ego vehicle at a given speed, and the additional information may be used to provide a more accurate stopping distance. The stopping distance model may also be configured to output a stopping time value indicating how long it will take the ego vehicle to stop from the current ego vehicle velocity. After the stopping distance value and/or stopping time value has been determined, the process 1400 can determine if the ego vehicle will be able to stop before a potential collision with the object. If the object has a velocity of about zero, the process 1400 can determine if the stopping distance value is greater than the distance between the front of the ego vehicle and the object, the ego vehicle may have to perform a lane change maneuver to avoid the object. The process 1400 can also determine that the ego vehicle may have to perform a lane change maneuver to avoid the object is the object has a velocity below a predetermined threshold, for example 10 m/s, which may indicate the vehicle is stopping or operating below a speed limit of a highway. The process 1400 can determine if there any objects in an adjacent lane that the ego vehicle may maneuver to within a threshold distance using information received from the sensors. During a lane change maneuver, the ego vehicle may change lanes and continue along the roadway at about the same velocity as before the maneuver was performed. In order to safely perform the maneuver, the process 1400 can determine that the adjacent lane is sufficiently clear of objects in order to change lanes without potentially colliding with an object in the adjacent lane. The process 1400 can determine that there are not any objects located within a longitudinal distance equal to how far the ego vehicle will travel in a predetermined time, such as about 2.5 s, at the current ego vehicle velocity. If the process 1400 determines that a collision cannot be avoided by braking alone and the object and that the adjacent lane is sufficiently clear of objects, the process 1400 can determine that the object cannot be avoided without a lane change maneuver. If the process 1400 determines that the object can be avoided without a lane change maneuver, the process can take alternative action, such as avoiding the obstacle by simply causing the ego vehicle to stay in the current lane and brake until stopped. The process can then proceed to 1428. The process can then proceed to 1428.

At 1428, if the process 1400 determined that the object can be avoided without a lane change maneuver ("YES" at 1428), the process 1400 can proceed to 1432. If the process 1400 determined that the object cannot be avoided without a lane change maneuver ("NO" at 1428), the process 1400 can proceed to 1436.

At 1432, the process 1400 can cause a vehicle control system of the ego vehicle to perform a vehicle maneuver without a lane change. The process 1400 may cause the vehicle control system to keep the ego vehicle traveling along the same lane and brake sufficiently to avoid a collision with the object. The process 1400 can then end.

At 1436, the process 1400 can determine a sequence of control inputs to avoid a collision between the ego vehicle and the object based on the drivable region. The drivable region can be a drivable tube, which can allows the tire slip to be minimized during lane change maneuvers on curved roads.

The sequence of control inputs can be used to maneuver the ego vehicle to an adjacent lane. The process 1400 can determine the sequence of control inputs by using information and/or parameters of the ego vehicle, the roadway, and the object to calculate values for unknown parameters used explicitly or implicitly in solving equation (37). In order to update the values of variables and/or parameters used in solving equation (37) and that may not be known until runtime (i.e. the distance between the front of the ego vehicle and the object), the process 1400 can utilize at least a portion of the ego vehicle information, the object information, the roadway information, and any parameters calculated based on the ego vehicle information, the object information, the roadway information in order to determine a sequence of control inputs for the current driving scenario.

Some unknown parameters, such as the right boundary $d_r$ of the drivable region can be input to equation (37) based on the drivable region, which has already been calculated.

The process 1400 may also utilize predetermined data such as tire data, ego vehicle manufacturer data, steering angle limits, and steering rate limits to calculate or directly supply values for parameters used in equation (37). In some embodiments, the predetermined data can be provided to the process 1400 in order to update certain parameters of equation (37) before the ego vehicle is driving on the roadway to eliminate the step of providing the data during execution of the process 1400. The process 1400 can then determine the values of various parameters used in solving equation (37), such as the distances shown in FIG. 2, based on the parameters provided. The process 1400 can then solve equation (37) using a nonlinear optimization technique.

Each control input u in the sequence of control inputs can be associated with a fixed timed interval, for example 100 ms. The length of the time interval can be chosen based on how quickly a steering subsystem of the vehicle can implement commanded steering rates. Each control input u can be formatted as a front steering rate $\dot{\delta}_f$ corresponding to a steering rate of front tires of the ego vehicle, and a rear steering rate $\dot{\delta}_r$ corresponding to a steering rate of rear tires of the ego vehicle as shown in equation (4) above. The sequence of control inputs can be calculated over a predetermined time horizon $t_h$ as described above, which may be about 3.0 s, and correspond to thirty consecutive control inputs lasting 100 ms. System dynamics, which can be calculated at a given time using equations (3)-(6) above, can be calculated at predetermined time steps $t_s$ which may be about 10 ms, over the time horizon $t_h$ using forward Euler integration.

A tire slip angle of a wheel can be calculated based on the lateral velocity of the ego vehicle, the yaw rate of vehicle, the distance of the wheel to a center of gravity of the vehicle, and the longitudinal velocity of the vehicle using equation (14). The process 1400 can calculate a score for a sequence of tire slip values (which are associated with a sequence of control inputs) over the time horizon $t_h$ using equation (14) above.

During the solving of the optimization problem posed by equation (37), the process 1400 can evaluate a given sequence of control inputs (which may also be referred to as a control trajectory) as for fitness and feasibility before potentially updating the sequence of control inputs to improve the fitness and/or feasibility of the control inputs. The process 1400 can find the fittest control input sequence The fitness of the sequence of control inputs is related to the maximum tire slip angle at the front wheels or rear wheels during the time horizon $t_h$, and lower maximum tire slip angles correspond to more fit solutions. The feasibility of the sequence of control inputs is related to the constraints imposed by equation (37) which will be described below. The process 1400 can use the constraints to determine the fittest sequence of control inputs that is also feasible. In other words, the process 1400 can minimize the maximum tire slip angle experienced during the time horizon $t_h$ while also providing a solution that satisfies a given set of constraints.

The constraints included in equation (37) may include a requirement that a point on the ego vehicle such as the center, i.e. the intersection of a midline along the length and a midline along the width of the ego vehicle, stay within the right boundary of the drivable region, which can be enforced by $KS(d_r, \rho_{edge}) \leq 0$, a requirement that the center of the ego vehicle stay within the left boundary of the drivable region, which can be given by $KS(d_l, \rho_{edge}) \leq 0$, a maximum front wheel tire slip value, which can be enforced by $KS(\alpha_f, \rho_{peak}) \leq \alpha_{peak}$, a maximum rear wheel tire slip value, which can be enforced by $KS(\alpha_r, \rho_{peak}) \leq \alpha_{peak}$, a final state stability requirement, which can be enforced by $(x_t)_i - (x_{stable})_i = 0$ $\forall i \in [4,8]$, and other constraints shown in equation (37) above. Requiring that a point on the vehicle stays within a left boundary and/or right boundary can ensure a portion of the vehicle stays within the left boundary and/or within the right boundary.

The forward velocity of the vehicle may remain about the same during the time horizon $t_h$ in accordance with testing procedures. The process can then proceed to 1440.

At 1440, the process 1400 can cause a vehicle control system of the ego vehicle to perform a vehicle maneuver based on the sequence of control inputs. As described above, the sequence of control inputs can be formatted as steering rates for front and/or rear wheels of the ego vehicle. The process 1400 can provide the sequence of steering rates to the vehicle control system, which can then steer the front wheels and/or rear wheels (depending on if the ego vehicle supports rear wheel steering) at the steering rate specified by the sequence of steering rates at a given time during the time horizon $t_h$. The steering rates may remain the same for a predetermined time, for example 100 ms. The process 1400 can proceed to 1444.

At 1444, the process 1400 can receive information about the roadway, the ego vehicle, and the object, and determine the general state of the roadway, the drivable region, the ego vehicle, and the object. At 1444, at least a portion, such as all, of steps 1404-1420 can be performed as described above. The process 1400 can then proceed to 1448.

At 1448, the process 1400 can determine whether or not the object has been avoided. Using the information about the object and/or the state of the object, the process 1400 can determine if the ego vehicle is longitudinally past the front of the object and laterally clear of the object, which may indicate the ego vehicle has passed the object and can continue driving along the roadway without performing a CIS maneuver. Otherwise, the vehicle may not have passed the object. The process 1400 can then proceed to 1452.

At 1452, if the process 1400 determined that the object has been avoided by the ego vehicle ("YES" at 1452), the process 1400 can proceed to end. If the process 1400 determined that the object has been avoided by the ego vehicle ("NO" at 1428), the process 1400 can proceed to 1436. In this way, the process 1400 can update the sequence of control maneuvers determined in 1436 based on the current information received and/or states determined in 1444.

In some embodiments, any suitable computer readable media can be used for storing instructions for performing the functions and/or processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as RAM, Flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, or any suitable media that is fleeting and devoid of any semblance of permanence during transmission, and/or any suitable intangible media.

It should be noted that, as used herein, the term mechanism can encompass hardware, software, firmware, or any suitable combination thereof.

It should be understood that the above described steps of the processes of FIGS. 13 and 14 can be executed or performed in any order or sequence not limited to the order and sequence shown and described in the figures. Also, some of the above steps of the processes of FIGS. 13 and 14 can be executed or performed substantially simultaneously where appropriate or in parallel to reduce latency and processing times.

Thus, the invention provides an improved method of performing a minimized lane change maneuver while minimizing a maximum slip angle experience during the maneuver.

Although the invention has been described in considerable detail with reference to certain embodiments, one skilled in the art will appreciate that the present invention can be practiced by other than the described embodiments, which have been presented for purposes of illustration and not of limitation. Therefore, the scope of the appended claims should not be limited to the description of the embodiments contained herein.

REFERENCES

[1] J.-M. Park, D.-W. Kim, Y.-S. Yoon, H. J. Kim, and K-S. Yi, "Obstacle avoidance of autonomous vehicles based on model predictive control," Proceedings of the Institution of Mechanical Engineers, Part D: Journal of Automobile Engineering, vol. 223, no. 12, pp. 1499-1516, 2009.

[2] M. A. Abbas, R. Milman, and J. M. Eklund, "Obstacle avoidance in real time with nonlinear model predictive control of autonomous vehicles," Canadian Journal of Electrical and Computer Engineering, vol. 40, no. 1, pp. 12-22, 2017.

[3] H. Febbo, J. Liu, P. Jayakumar, J. L. Stein, and T. Ersal, "Moving obstacle avoidance for large, high-speed autonomous ground vehicles," in American Control Conference, 2017, pp. 5568-5573.

[4] N. R. Kapania and J. C. Gerdes, "Design of a feedback-feedforward steering controller for accurate path tracking and stability at the limits of handling," Vehicle System Dynamics, vol. 53, no. 12, pp. 1687-1704, 2015.

[5] V. A. Laurense, J. Y. Goh, and J. C. Gerdes, "Path-tracking for autonomous vehicles at the limit of friction," in American Control Conference, 2017, pp. 5586-5591.

[6] F. Altche, P. Polack, and A. de La Fortelle, "A simple dynamic model for aggressive, near-limits trajectory planning," arXiv preprint arXiv:1703.01225, 2017.

[7] J. Liu, P. Jayakumar, J. L. Stein, and T. Ersal, "Combined speed and steering control in high speed autonomous ground vehicles for obstacle avoidance using model predictive control," IEEE Transactions on Vehicular Technology, vol. 66, no. 10, pp. 8746-8763, 2017.

[8], "A nonlinear model predictive control formulation for obstacle avoidance in high-speed autonomous ground vehicles in unstructured environments," Vehicle System Dynamics, pp. 1-30, 2017.

[9] I. Chakraborty, P. Tsiotras, and R. S. Diaz, "Time-optimal vehicle posture control to mitigate unavoidable collisions using conventional control inputs," in American Control Conference, 2013, pp. 2165-2170.

[10] S. J. Anderson, S. C. Peters, T. E. Pilutti, and K. Iagnemma, "An optimal control-based framework for trajectory planning, threat assessment, and semi-autonomous control of passenger vehicles in hazard avoidance scenarios," International Journal of Vehicle Autonomous Systems, vol. 8, no. 2-4, pp. 190-216, 2010.

[11] J. Wurts, J. L. Stein, and T. Ersal, "Collision imminent steering using nonlinear model predictive control," American Control Conference, 2018.

[12] A. A. O. S. Highway and T. Off, A Policy on Geometric Design of Highways and Streets 2001. American Association of State Highway Transport., 2001.

[13] E. Bakker, L. Nyborg, and H. B. Pacejka, "Tyre modelling for use in vehicle dynamics studies," SAE Technical Paper, Tech. Rep., 1987.

[14] J. Liu, P. Jayakumar, J. L. Stein, and T. Ersal, "A study on model fidelity for model predictive control-based obstacle avoidance in highspeed autonomous ground vehicles," Vehicle System Dynamics, vol. 54, no. 11, pp. 1629-1650, 2016.

[15] G. J. Heydinger, R. A. Bixel, W. R. Garrott, M. Pyne, J. G. Howe, and D. A. Guenther, "Measured vehicle inertial parameters-NHTSAs data through November 1998," SAE Technical Paper, Tech. Rep., 1999.

[16] A. Alleyne, "A comparison of alternative obstacle avoidance strategies for vehicle control," Vehicle System Dynamics, vol. 27, no. 5-6, pp. 371-392, 1997.

[17] Y. Peng and X. Yang, "Comparison of various double-lane change manoeuvre specifications," Vehicle System Dynamics, vol. 50, no. 7, pp. 1157-1171, 2012.

[18] G. Kreisselmeier and R. Steinhauser, "Systematic control design by optimizing a vector performance index," in Computer aided design of control systems. Elsevier, 1980, pp. 113-117.

[19] A. Richards, "Fast model predictive control with soft constraints," European Journal of Control, vol. 25, pp. 51-59, 2015.

[20] J. Wurts, J. L. Stein, and T. Ersal, "Increasing computational speed of automotive nonlinear model predictive control using analytic gradients," Conference on Control Technology and Applications, 2018.

[21] A. Wachter and L. T. Biegler, "On the implementation of an interior point filter line-search algorithm for large-scale nonlinear programming," Mathematical Programming, vol. 106, no. 1, pp. 25-57, 2006.

[22] J. Liu, P. Jayakumar, J. L. Stein, and T. Ersal, "Improving the robustness of an mpc-based obstacle avoidance algorithm to parametric uncertainty using worst-case scenarios," Vehicle System Dynamics, pp. 1-40, 2018. [Online]. Available: https://doi.org/10.1080/00423114.2018.1492141

[23] J. Wurts, J. L. Stein, and T. Ersal, "Collision imminent steering using nonlinear model predictive control," in 2018 Annual American Control Conference (ACC). IEEE, 2018, pp. 4772-4777.

[24] S. Di Cairano, U. Kalabic, and K. Berntorp, "Vehicle tracking control on piecewise-clothoidal trajectories by mpc with guaranteed error bounds," in IEEE Conference on Decision and Control (CDC). IEEE, 2016, pp. 709-714.

[25] M. Brown, J. Funke, S. Erlien, and J. C. Gerdes, "Safe driving envelopes for path tracking in autonomous vehicles," Control Engineering Practice, vol. 61, pp. 307-316, 2017.

[26] S. J. Anderson, S. C. Peters, T. E. Pilutti, and K. Iagnemma, "An optimal-control-based framework for trajectory planning, threat assessment, and semi-autonomous control of passenger vehicles in hazard avoidance scenarios," International Journal of Vehicle Autonomous Systems, vol. 8, no. 2-4, pp. 190-216, 2010.

[27] S. M. Erlien, S. Fujita, and J. C. Gerdes, "Safe driving envelopes for shared control of ground vehicles," IFAC Proceedings Volumes, vol. 46, no. 21, pp. 831-836, 2013.

[28] A. A. O. S. Highway and T. Off, A Policy on Geometric Design of Highways and Streets 2001. American Association of State Highway Transport., 2001.

[29] U. D. of Transportation, Speed Concepts: Informational Guide. Federal Highway Administration, 2009.

[30] J. Liu, P. Jayakumar, J. L. Stein, and T. Ersal, "A study on model fidelity for model predictive control-based obstacle avoidance in highspeed autonomous ground vehicles," Vehicle System Dynamics, vol. 54, no. 11, pp. 1629-1650, 2016.

[31] Y. Peng and X. Yang, "Comparison of various double-lane change manoeuvre specifications," Vehicle System Dynamics, vol. 50, no. 7, pp. 1157-1171, 2012.

[32] J. Wurts, J. L. Stein, and T. Ersal, "Collision imminent steering at high speed using nonlinear model predictive control," Transactions on Vehicle Technology, under review, 2018.

[33] J. Liu, P. Jayakumar, J. L. Stein, and T. Ersal, "A nonlinear model predictive control formulation for obstacle avoidance in high-speed autonomous ground vehicles in unstructured environments," Vehicle System Dynamics, pp. 1-30, 2017.

[34] A. Wachter and L. T. Biegler, "On the implementation of an interior point filter line-search algorithm for large-scale nonlinear programming," Mathematical Programming, vol. 106, no. 1, pp. 25-57, 2006.

The citation of any document is not to be construed as an admission that it is prior art with respect to the present invention.

What is claimed is:

1. A method in a data processing system comprising at least one processor and at least one memory, the at least one memory comprising instructions executed by the at least one processor to implement a lane change system, the method comprising:
   (a) receiving, from at least one of a plurality of sensors coupled to a vehicle, information associated with a location of an object longitudinally ahead of the vehicle;
   (b) at a first time, determining a sequence of control inputs to avoid a collision between the vehicle and the object based on a constraint and the location of the object, the sequence of control inputs being associated with a time horizon, wherein each control input in the sequence of control inputs is associated with a corresponding fixed time interval of the time horizon, wherein the fixed time intervals occur consecutively, and the determining the sequence of control inputs comprising a minimization of a maximum tire slip angle of the vehicle during the time horizon subject to the constraint, wherein each control input of the sequence of control inputs is determined based on the minimization;
   (c) propagating, based on the sequence of control inputs, a generated safe state trajectory; and
   (d) during a time interval, causing a vehicle control system of the vehicle to perform a series of vehicle maneuvers, each of the series of vehicle maneuvers based on a corresponding one of the sequence of control inputs and the generated safe state trajectory, wherein the first time precedes the time interval.

2. The method of claim 1, further comprising:
calculating a first sequence of tire slip values associated with the time horizon and a front wheel of the vehicle; and
calculating a second sequence of tire slip values associated with the time horizon and a rear wheel of the vehicle.

3. The method of claim 2, wherein each tire slip angle is calculated based on a lateral velocity of the vehicle, a yaw rate of vehicle, a distance of the associated wheel to a center of gravity of the vehicle, and a longitudinal velocity of the vehicle.

4. The method of claim 2, wherein the first tire slip sequence is associated with a sequence of front steering angle values of the front wheels of the vehicle and a sequence of lateral velocity values of the vehicle corresponding to the sequence of front steering angle values,
and wherein the constraint comprises:
a first constraint requiring that a final front steering angle value in the sequence of front steering angle values is no greater than a first predetermined value
and a second constraint requiring that a final lateral velocity value in the sequence of lateral velocity values is equal to a second predetermined value.

5. The method of claim 4, wherein the first predetermined value is two degrees and the second predetermined value is one-tenth of a meter per second.

6. The method of claim 2, further comprising:
calculating a score for the first sequence of tire slip angles and the second sequence of tire slip angles based on a maximum allowable slip value.

7. The method of claim 1 further comprising:
determining a longitudinal distance between the vehicle and the object based on the information.

8. The method of claim 1, wherein the constraint comprises a minimum lateral distance to be maintained between the object and the vehicle at a longitudinal location of the object.

9. The method of claim 1, wherein the vehicle control system comprises a steering subsystem configured to steer front wheels of the vehicle, and
wherein the constraint comprises a steering rate limit for the steering subsystem.

10. The method of claim 1 further comprising:
receiving, from at least one of the plurality of sensors, roadway information about a roadway the vehicle is traveling on; and
determining a lane boundary of a roadway based on the roadway information;

wherein the constraint comprises a requirement that a predetermined portion of the vehicle must remain on a side of the lane boundary.

11. A method in a data processing system comprising at least one processor and at least one memory, the at least one memory comprising instructions executed by the at least one processor to implement a lane change system, the method comprising:
(a) receiving, from at least one of a first plurality of sensors coupled to a vehicle, first information about a roadway;
(b) receiving, from at least one of the first plurality of sensors, second information about a location of an object;
(c) determining a drivable region based on the first information and the second information, the drivable region comprising a boundary;
(d) propagating a generated safe state trajectory;
(e) at a first time determining a sequence of control inputs to avoid a collision between the vehicle and the object based on a constraint, the location of the object, and the boundary,
the sequence of control inputs being associated with a time horizon, wherein each control input in the sequence of control inputs is associated with a corresponding fixed time interval of the time horizon, wherein the fixed time intervals occur consecutively,
and the determining the sequence of control inputs comprising:
minimizing a maximum tire slip angle of the vehicle during the time horizon subject to the constraint, wherein each control input of the sequence of control inputs is determined based on the minimizing the maximum tire slip angle; and
(f) at a second time causing a vehicle control system of the vehicle to perform a vehicle maneuver based on a first control input of the first sequence of control inputs and the generated safe state trajectory,
wherein the first time occurs before the second time.

12. The method of claim 11, wherein the first sequence of control inputs comprises a sequence of steering rates for a front wheel of the vehicle.

13. The method of claim 11, wherein the second information includes information about the object that is located longitudinally ahead of the vehicle.

14. The method of claim 11, wherein the first tire slip sequence is determined using nonlinear Model Predictive Control.

15. The method of claim 11 wherein:
the sequence of control inputs are based at least in part on a stopping distance model, the stopping distance model including a plurality of stopping distances determined using manufacturing test data.

16. A driving control system for a vehicle comprising a vehicle control system configured to steer front wheels of the vehicle, the driving control system comprising:
a plurality of sensors coupled to the vehicle; and
a controller in electrical communication with the first plurality of sensors and the vehicle control system, the controller being configured to execute a program to:
(i) receive first information about a roadway from at least one of the plurality of sensors;
(ii) receive second information about a location of an object from at least one of the plurality of sensors;
(iii) determine a drivable region based on the first information and the second information, the drivable region comprising a boundary;
(iv) propagate a generated safe state trajectory;
(v) at a first time_determine a sequence of control inputs to avoid a collision between the vehicle and the object based on a constraint, the location of the object, and the boundary,
the sequence of control inputs being associated with a time horizon, wherein each control input in the sequence of control inputs is associated with a corresponding fixed time interval of the time horizon, wherein the fixed time intervals occur consecutively,
and the determining the sequence of control inputs comprising:
minimizing a maximum tire slip angle of the vehicle during the time horizon subject to the constraint, wherein each control input of the sequence of control inputs is determined based on the minimizing of the maximum tire slip angle; and
(vi) during a time interval, cause the vehicle control system of the vehicle to perform a vehicle maneuver based on the sequence of control inputs and the generated safe state trajectory,
wherein the first time occurs before the time interval.

17. The system of claim 16 further comprising:
determining the object is located longitudinally ahead of the vehicle.

18. The system of claim 17, wherein the first sequence of control inputs comprises a sequence of steering rates for a front wheel of the vehicle and the controller is further configured to execute the program to:
calculate the sequence of tire slip angles,
the sequence of tire slip angles comprising a sequence of tire slip angles corresponding the front wheel, and
the constraint comprising that a steering angle of the front wheel at a final tire slip angle in the first sequence of tire slip angles is equal to a first predetermined value.

* * * * *

UNITED STATES PATENT AND TRADEMARK OFFICE
CERTIFICATE OF CORRECTION

PATENT NO. : 12,195,083 B2
APPLICATION NO. : 16/452936
DATED : January 14, 2025
INVENTOR(S) : Tulga Ersal et al.

Page 1 of 1

It is certified that error appears in the above-identified patent and that said Letters Patent is hereby corrected as shown below:

In the Specification

Column 13, Line 64, "not to relevant minimum" should be --not relevant to the minimum--.

Column 16, Eq. (17), "$\sum_{i=1}^{n}$" should be --$\sum_{i=1}^{n}$--.

Column 16, Eq. (18), "$\sum_{i=1}^{n}$" should be --$\sum_{i=1}^{n}$--.

Column 29, Eq. (30), "$\sum_{i=1}^{n}$" should be --$\sum_{i=1}^{n}$--.

Column 30, Eq. (35), "$\sum_{i=1}^{n}$" should be --$\sum_{i=1}^{n}$--.

Column 30, Eq. (36), "$\sum_{i=1}^{n}$" should be --$\sum_{i=1}^{n}$--.

Signed and Sealed this
Eleventh Day of March, 2025

Coke Morgan Stewart
*Acting Director of the United States Patent and Trademark Office*